US011587193B2

(12) United States Patent
Liu et al.

(10) Patent No.: US 11,587,193 B2
(45) Date of Patent: Feb. 21, 2023

(54) SMART VEHICLE PARKING APPARATUS AND RELATED METHODS

(71) Applicant: Ford Motor Company, Dearborn, MI (US)

(72) Inventors: Yimin Liu, Ann Arbor, MI (US); Erin Marie Clausing, Dearborn, MI (US); Jiaqi Ma, Dearborn, MI (US); Liang Zhang, Shanghai (CN); Ping Hui Li, Shanghai (CN)

(73) Assignee: FORD MOTOR COMPANY, Dearborn, MI (US)

( * ) Notice: Subject to any disclaimer, the term of this patent is extended or adjusted under 35 U.S.C. 154(b) by 553 days.

(21) Appl. No.: 16/487,952

(22) PCT Filed: Feb. 22, 2017

(86) PCT No.: PCT/US2017/018850
§ 371 (c)(1),
(2) Date: Aug. 22, 2019

(87) PCT Pub. No.: WO2018/156112
PCT Pub. Date: Aug. 30, 2018

(65) Prior Publication Data
US 2019/0385265 A1  Dec. 19, 2019

(51) Int. Cl.
*G06Q 50/30* (2012.01)
*H04W 4/029* (2018.01)
(Continued)

(52) U.S. Cl.
CPC .......... *G06Q 50/30* (2013.01); *B60R 25/245* (2013.01); *G01C 21/3685* (2013.01);
(Continued)

(58) Field of Classification Search
CPC ....... G06Q 50/30; G06Q 10/02; H04W 4/029; B60R 25/245; B60R 2325/205; G01C 21/3685
(Continued)

(56) References Cited

U.S. PATENT DOCUMENTS

| 5,289,369 A | 2/1994 | Hirshberg |
| 5,812,070 A | 9/1998 | Tagami et al. |

(Continued)

FOREIGN PATENT DOCUMENTS

| CN | 104183148 | 12/2014 |
| GB | 2517795 | 3/2015 |

(Continued)

OTHER PUBLICATIONS

"A simple reservation and allocation model of shared parking lots" Published by Elsevier (Year: 2016).*

(Continued)

*Primary Examiner* — Zeina Elchanti
(74) *Attorney, Agent, or Firm* — Brandon Hicks; Hanley, Flight & Zimmerman, LLC

(57) ABSTRACT

Smart vehicle parking apparatus and related methods are disclosed herein. An example system includes a processor to reserve a personal vehicle for a time interval. The personal vehicle is to park at a location during the time interval. The processor is also to match a vehicle use option to the personal vehicle based on the time interval and the location. The vehicle use option is associated with a person to use the personal vehicle during the time interval.

20 Claims, 10 Drawing Sheets

(51) Int. Cl.
 *G01C 21/36* (2006.01)
 *G06Q 10/02* (2012.01)
 *B60R 25/24* (2013.01)

(52) U.S. Cl.
 CPC ............ *G06Q 10/02* (2013.01); *H04W 4/029* (2018.02); *B60R 2325/205* (2013.01)

(58) Field of Classification Search
 USPC .......................................................... 705/5
 See application file for complete search history.

(56) References Cited

U.S. PATENT DOCUMENTS

| | | | |
|---|---|---|---|
| 9,082,237 | B2 | 7/2015 | Breed |
| 9,239,815 | B2 | 1/2016 | O'Dwyer et al. |
| 9,807,547 | B1 * | 10/2017 | Oesterling ............ G06Q 30/02 |
| 2003/0090363 | A1 * | 5/2003 | Ogura ................... G07B 15/00 340/5.4 |
| 2005/0280555 | A1 | 12/2005 | Warner, IV |
| 2006/0259353 | A1 | 11/2006 | Gutmann |
| 2012/0056758 | A1 | 3/2012 | Kuhlman et al. |
| 2013/0304515 | A1 | 11/2013 | Gryan et al. |
| 2013/0321178 | A1 | 12/2013 | Jameel et al. |
| 2013/0325521 | A1 | 12/2013 | Jameel et al. |
| 2014/0129301 | A1 | 5/2014 | Van Wiemeersch et al. |
| 2014/0142783 | A1 * | 5/2014 | Grimm .................. H04W 4/48 701/2 |
| 2014/0278608 | A1 | 9/2014 | Johnson et al. |
| 2014/0358595 | A1 * | 12/2014 | Brown .................. G06Q 10/02 705/5 |
| 2014/0372155 | A1 | 12/2014 | Wang et al. |
| 2015/0009047 | A1 | 1/2015 | Ashkenazi et al. |
| 2015/0285645 | A1 | 10/2015 | Maise et al. |
| 2015/0310679 | A1 | 10/2015 | Fokkelman |
| 2015/0348179 | A1 * | 12/2015 | Kamisawa ............. G06Q 10/02 705/5 |
| 2016/0027307 | A1 * | 1/2016 | Abhyanker ............ G08G 1/202 701/117 |
| 2016/0247327 | A1 * | 8/2016 | Kozawa ................. G06Q 10/06 |
| 2016/0356615 | A1 | 12/2016 | Arata et al. |
| 2016/0364812 | A1 | 12/2016 | Cao |
| 2017/0032584 | A1 | 2/2017 | Moran et al. |
| 2017/0178511 | A1 * | 6/2017 | Berns ..................... G08G 1/143 |
| 2017/0206475 | A1 * | 7/2017 | Shoen ................ G06Q 30/0645 |
| 2017/0323227 | A1 * | 11/2017 | Sadeghi ............... G06Q 20/102 |
| 2017/0351975 | A1 * | 12/2017 | Webb .................... H04W 4/029 |
| 2018/0025294 | A1 * | 1/2018 | Hugla ..................... G08G 1/20 705/5 |
| 2018/0087923 | A1 * | 3/2018 | Hugla .................. G06Q 10/047 |
| 2018/0197349 | A1 * | 7/2018 | Oesterling ............. G07C 5/008 |

FOREIGN PATENT DOCUMENTS

| | | |
|---|---|---|
| JP | 2015018464 | 1/2015 |
| JP | 2016130944 | 7/2016 |

OTHER PUBLICATIONS

International Searching Authority, "International Search Report and Written Opinion," issued in connection with International Patent Application No. PCT/US17/18850, dated Jun. 22, 2017, 15 pages.
International Bureau, "International Preliminary Report on Patentability," issued in connection with International Patent Application No. PCT/US17/18850, dated Aug. 27, 2019, 11 pages.
Mitroff, "Let a Stranger Drive Your Car While You Travel, and the Airport Parking is Free," Wired, Feb. 20, 2013, retrieved from [http://www.wired.com/2013/02/flightcar/] on Aug. 3, 2016, 5 pages.
China National Intellectual Property Administration, "Notification of First Office Action," issued in connection with Chinese Patent Application No. 2017800872168, dated Nov. 28, 2022, 17 pages.

* cited by examiner

SMART VEHICLE PARKING APPARATUS AND RELATED METHODS

FIELD OF THE DISCLOSURE

This disclosure relates generally to vehicle parking and, more particularly, to smart vehicle parking apparatus and related methods.

BACKGROUND

Parking a vehicle in a city can be time consuming with respect to finding a parking spot and/or costly with respect to parking or service fees. Some individuals do not have regular access to parking services (e.g., via a parking facility) to accommodate their personal vehicle. Typically, drivers or vehicle owners leave their vehicles parked at a parking facility during a time for which they do not have a use of their vehicles. On the other hand, individuals who do not own or otherwise have access to a vehicle may wish to rent or share a vehicle instead of taking public transportation. Oftentimes, individuals who travel require multiple modes or types of transportation services during a trip including parking related services for a personal vehicle.

SUMMARY

An example system disclosed herein includes a processor to reserve a personal vehicle for a time interval. The personal vehicle is to park at a location during the time interval. The processor is to match a vehicle use option to the personal vehicle based on the time interval and the location. The vehicle use option is associated with a person to use the personal vehicle during the time interval.

An example apparatus disclosed herein includes an electronic meter at a location to reserve a parking spot for a first person during a time interval, the reserved parking spot to receive a personal vehicle driven by the first person for use by a second person during the time interval.

Another example disclosed herein includes a tangible machine-readable storage medium comprising instructions which, when executed, cause a processor to perform a first comparison of a first travel route associated with a first person who is to park a vehicle during a time interval with a second travel route associated with a second person having a first need for the vehicle. The processor is to notify, based on the first comparison, the first person that the personal vehicle is available to satisfy the first need for the vehicle.

Another example disclosed herein includes a tangible machine-readable storage medium comprising instructions which, when executed, cause a processor to reserve a parking spot for a time interval at a location for a first person having a need for transportation. The first person is to park a personal vehicle at the location for use by a second person during the time interval. The processor is to match a transportation option to the first person based on the time interval and the location. The transportation option is associated with a vehicle to satisfy the need for transportation.

Another example disclosed herein includes a tangible machine-readable storage medium comprising instructions which, when executed, cause a processor to predict, based on historical use data of a parking facility, whether a parking spot at the parking facility is available during a time interval. The processor is to match a parking request associated with a first vehicle to the parking facility based on the prediction and the time interval. The first vehicle is to park at the parking facility during the time interval.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1A:
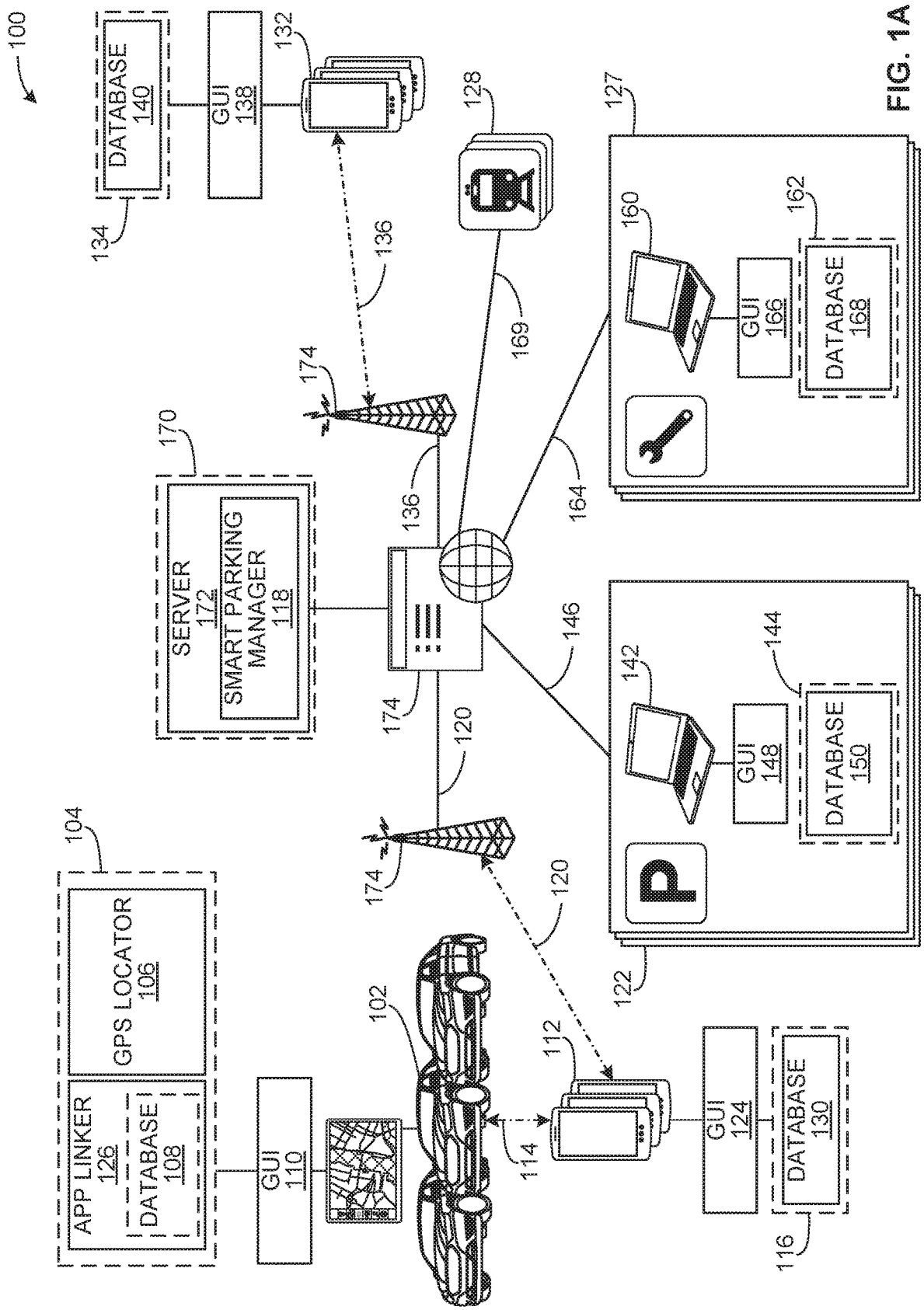
FIG. 1A illustrates an example system including an example parking facility, an example vehicle and example mobile devices for interacting with an example cloud-based parking application in accordance with the teachings disclosed herein.

Parking a vehicle in a city can be time-consuming and difficult with respect to efforts to find a parking spot on a street or in a parking facility such as a parking garage or lot. Parking a vehicle in a city can also be expensive in view of limited parking availability and associated fees such as, for example, reserving regular access to a parking spot at a parking facility. As a result of such difficulties and expenses, use of a parking facility by drivers or vehicle owners may be negatively affected. Additionally, drivers or vehicle owners typically leave their vehicles parked at a parking facility during times for which they do not have a use for their vehicles.

On the other hand, some individuals who do not own or have access (e.g., regular access) to a vehicle may have occasions for which they need or prefer to use (e.g., drive, share or car-pool, etc.) a vehicle to reach their destination and/or after they reach their destination. In some such examples, an individual without access to a vehicle may rent a vehicle from a company that owns vehicles for rental (e.g., a car rental company such as Hertz or a car-sharing company such as ZipCar™). However, these types of companies or transportation services do not satisfy certain transportation and/or parking related needs and/or preferences of individuals.

Example apparatus and methods disclosed herein resolve and/or satisfy transportation related needs and/or preferences of individuals with respect to vehicle and parking services. More specifically, some disclosed examples match vehicles (e.g., personal vehicles) that would otherwise be parked in a parking facility with individuals who need or desire to rent and/or use (e.g., drive, share, car-pool, service, etc.) a vehicle. Other disclosed examples may predict an availability of parking services at parking facilities (e.g., near a requested destination) and enable a driver to reserve the services in advance of arrival to a parking facility. In some such examples, an electronic meter may be implemented within a parking facility to reserve a parking spot (e.g., during an afternoon or other time intervals) for a vehicle and to facilitate the use of the vehicle by one or more drivers (e.g., other than an owner of the vehicle) during the reservation. Some examples enable an owner of the vehicle to schedule vehicle maintenance services (e.g., an oil change) for the vehicle and/or to receive alternative transportation options (e.g., an on-demand vehicle service, public buses or trains, etc.) while the vehicle is parked or scheduled to be parked in the parking facility.

In some examples described herein, an individual interested in using a vehicle and/or parking related services interacts with a cloud-based platform via a smart or mobile device (e.g., a smartphone, a tablet, an infotainment system of a vehicle, etc.), which allows or enables the individual to view and/or select options relating to availability and details of parking services at a parking facility, vehicles available for use at a parking facility, reservation and/or service prices, etc. In some examples, a driver or vehicle owner interested in permitting other drivers or individuals (e.g., employees to provide a service) to use and/or service their vehicle interacts with an application via a smart device to monitor, manage and/or set preferences relating to rental or use activity for their vehicle during a time when their vehicle may have otherwise been parked (e.g., at a reserved parking spot). These preferences may relate to locations of their vehicle, intended use of their vehicle, prices and/or selections of a particular renter or user.

Examples disclosed herein advantageously use matching algorithms to match individuals having needs for certain transportation and/or parking related services (e.g., parking reservations, vehicle reservations, vehicle maintenance, etc.) to appropriate service options (e.g., a parking facility, a vehicle for rent or use, a vehicle service provider, an on-demand vehicle provider, etc.) based on criteria and/or the needs of the individuals. In some examples, a matching algorithm is implemented to match an individual interested in renting and/or using a vehicle with a parked vehicle or with a vehicle that is scheduled to park. Examples disclosed herein optimize vehicle use options (e.g., renting, sharing, car-pooling, servicing, etc.) of the parked vehicle by matching the vehicle to individuals while, in some examples, minimizing costs for an owner of the vehicle, maximizing usage of the parked vehicle and/or satisfying rental preferences of the owner. In such examples, usage and/or revenue of vehicles are optimized in view of driver and/or renter needs. Other examples disclosed herein optimize use of a parking facility by matching available parking spots to vehicles while, in some examples, maximizing revenue of the parking facility and/or maximizing occupied parking spots within the parking facility.

Examples disclosed herein automatically collect data associated with vehicles parked (e.g., currently and/or previously) in a parking facility, such as vehicle types, durations of time that the vehicles will be and/or have been parked in the parking facility before the owners of the vehicles return/returned, the locations of the vehicles within the parking facility, etc. via wireless communication with smart and/or mobile devices associated with the vehicles, drivers and/or the parking facility. A cloud-based platform may store the data associated with the vehicles and/or drivers that may use the parking facility. In other examples, the cloud-based platform may store data associated with travel routes and/or travel patterns of drivers, vehicles and/or individuals who may have a need for transportation. In such examples, the cloud-based platform processes and/or analyzes the travel data to identify compatibilities, notify the individuals and/or, more generally, to resolve or satisfy their needs for transportation. In other examples, the cloud-based platform predicts (e.g., based on real-time and/or historical data relating to customer use of a parking facility) an availability of candidate parking spots within a parking facility and may provide the prediction to a driver to facilitate decisions of the driver with respect to locating, reserving and/or using a particular parking facility or service.

An example system 100 to provide smart parking and vehicle management in accordance with the teachings of this disclosure is illustrated in FIG. 1A. The example system 100 includes vehicles 102 such as personal or private cars, trucks, vans, etc. In some examples, drivers or owners (e.g., persons) associated with the vehicles 102 desire to park and/or permit other drivers or persons to use (e.g., rent, share, service or maintain, etc.) their vehicles 102 before and/or after their vehicles 102 may be parked. One or more of the vehicles 102 may include a first processor 104 such as a user device (e.g., an infotainment system, a smart or mobile device, a personal computer, etc.). The first processor 104 can control and/or provide, for example, infotainment services such as music, radio, navigation and/or access to user devices or applications, which will be explained in greater detail below. The first processor 104 can include, in some examples, a Global Positioning Satellite (GPS) locator 106 that provides vehicle location information/data and/or navigation to a destination via GPS data. The first processor 104 includes a first database 108 to store data received via the GPS locator 106 and/or data corresponding to inputs provided by drivers or passengers of the vehicles 102 via a user interface of the first processor 104 such as a first example graphical user interface (GUI) 110. In the example system 100 of FIG. 1A, the first processor 104 may be in communication (e.g., wirelessly) with one or more first user devices 112, as represented by a first communication link 114.

The first user devices 112 can belong to and/or be used by persons such as the drivers or owners of the vehicles 102 (i.e., users of the first user devices 112) that may have a desire or need to park their vehicles 102, receive vehicle related services (e.g., vehicle maintenance and/or on-demand transportation) during time intervals for which they may not be using their vehicles 102. The first user devices 112 may include smart or mobile devices such as smartphones, tablets and/or, more generally, electronic devices having wireless and/or web-based communication capability (e.g., via satellite networks, cellular networks, other communication networks having access to the Internet, etc.). Each of the first user devices 112 includes a second processor 116 that exchanges data and/or communicates with (e.g., via the Internet) a smart parking manager 118 as represented by a second communication link 120. In some examples, the smart parking manager 118 enables the users of the first user devices 112 to view availability of parking and/or vehicle services at one or more parking facilities 122 (e.g., garages or lots), select candidate parking spots (e.g., at the parking facilities 122), select candidate persons (e.g., drivers, passengers and/or employees) to use their vehicles 102 and/or manage the use of their vehicles 102 by the selected candidate persons during time intervals when their vehicles 102 may have otherwise been parked. In other examples, the smart parking manager 118 facilitates a secure monetary transaction (e.g., via PayPal™) for users of the first user devices 112 that may have received parking and/or vehicle related services using the smart parking manager 118.

Users of the first user devices 112 can interact (e.g., view data and/or enter data) with the smart parking manager 118 via user interfaces (e.g., human machine interfaces (HMIs) and/or graphical user interfaces (GUIs)) such as the first example GUI 110 of the first processor 104 and/or a second GUI 124 of the second processor 116, which is explained in greater detail below in connection with FIG. 2. In some examples, when the vehicles 102 are turned on, the smart parking manager 118 can be accessed via an application linker 126 of the first processor 104. When the smart parking manager 118 is accessed via the application linker 126 of the vehicles 102, drivers or owners of the vehicles 102 can interact with the smart parking manager 118 via the first example GUI 110 of the first processor 104 by using, for example, one or more buttons on a steering wheel, voice commands through speakers, etc.

In some examples, the drivers or owners of the vehicles 102 can use the smart parking manager 118 to view parking availability in an area that may be near their desired destinations (e.g., prior to their arrival at their desired destinations). For example, the smart parking manager 118 can use vehicle location data collected by the GPS locator 106 with respect to current locations of the vehicles 102 and/or an intended destinations of the vehicles 102 (e.g., as provided by the drivers or owners). In other examples, the smart parking manager 118 can use location data collected by the first user devices 112 (e.g., via a GPS locator of the first user devices) and/or intended destinations of the users of the first user devices 112. The smart parking manager 118 can output available parking options for display via the first example GUI 110 and/or the second example GUIs 124, such as candidate parking spots within parking facilities 122, attributes, locations, fees and/or costs of the candidate parking spots and/or time intervals during which the candidate parking spots may be available. The users of the first user devices 112 can interact with the output or displayed parking options to provide selections of desired candidate parking spots that may be available at certain locations (e.g., within the parking facilities 122) during certain time intervals.

In other examples, the smart parking manager 118 can present or provide available vehicle service or use options that may be associated with the parking facilities 122, such as services provided by vehicle service providers 127, fees and/or costs for the vehicle service options and/or time intervals during which the vehicle service options may be available. The vehicle service providers 127 can include businesses providing vehicle maintenance (e.g., oil changes, tire rotations, etc.) within and/or near the parking facilities 122. In some such examples, the users of the first user devices 112 can interact with the output or displayed vehicle service options to provide a selection of desired vehicle service options such as certain vehicle service providers 127 to provide certain services to the vehicles 102.

In other examples, the smart parking manager 118 can present or provide available services provided by transportation resources or options 128 for display via the first example GUI 110 and/or the second example GUIs 124, such as services provided by on-demand vehicle providers (e.g., dynamic shuttle busses), commercial airlines, public or private transportation, etc. In some such examples, the smart parking manager may display information or data associated with the transportation resources or options 128 such as fees and/or costs to use the transportation resources or options 128, time intervals the transportation options 128 may be available and/or locations of and/or directions to the transportation options 128. In some such examples, users of the first user devices 112 can view and/or interact with the output or displayed transportation options 128 to provide selections of desired transportation options 128, such as selecting commercial airline flights and/or on-demand vehicles to use after parking their vehicles 102 at the parking facilities 122. In other examples, the smart parking manager 118 determines availability of the transportation options 128 after receiving requests via the first user devices 112 and/or the second user devices 132. In some such examples, the determinations are based on real-time conditions (e.g., traffic conditions, weather conditions and/or fuel levels of the vehicles 102).

Additionally or alternatively, in some examples, the smart parking manager 118 enables drivers or owners of the vehicles 102 to allow or permit their vehicles 102 to be rented, driven and/or otherwise used by candidate persons (e.g., drivers, passengers and/or employees), other than the drivers or owners of the vehicles 102 during time intervals that may be requested by the candidate persons. In some such examples, the users of the first user devices 112 can set one or more user preferences with respect to rental fees, costs and/or whether their vehicles 102 can be used by certain candidate persons. In other examples, the user preferences can be set with respect to use of the vehicles 102 (e.g., mileage and/or geographical limits during requested time intervals and/or costs to use the vehicles 102). The above-described user preferences may be stored in the first database 108 and/or a second database 130 of the first processor 104. In some examples, the second database 130 stores locations of the first user devices 112 and/or, more generally, data associated with and/or entered by the users of the first user devices 112. Additionally or alternatively, the smart parking manager 118 enables the users of the first user devices 112 to select desired candidate persons to use their vehicles 102. In any case, the smart parking manager 118 tracks locations of the vehicles 102 during time intervals in which the vehicles are permitted to be used by the candidate persons via the first processor 104 of the vehicles 102 and/or second user devices 132 associated with the candidate persons.

In the example system 100, each of the second user devices 132 includes a third processor 134 that exchanges data and/or communicates with the smart parking manager 118 as represented by a third communication link 136. The second user devices 132 can belong to and/or be used by persons such as drivers or passengers (i.e., users of the second user devices 132) that may have a need and/or preference for transportation such as using one or more of the vehicles 102. The users of the second user devices 132 can interact with the smart parking manager 118 via a third example GUI 138 of the third processor 134, which is explained in greater detail below in connection with FIG. 3. The smart parking manager 118 enables the users of the second mobile devices 132 to, in some examples, view availability of the vehicles 102 that may be parked and/or scheduled to park at one or more of the parking facilities 122 and/or request use of the vehicles 102. In some examples, the users of the third user devices 142 may request services from one or more of the transportation options 128 such as, for example, using dynamic shuttle buses to travel between locations (e.g., their current locations) and the parking facilities 122. The users of the second user devices 132 can enter data to the smart parking manager 118 via the third GUI 138 of the second user devices 132, such as desired time intervals to use the vehicles 102, user preferences (e.g., preferred vehicle types, pick-up locations, fees or costs, etc.), destinations, pick-up locations, drop-off locations, etc. The smart parking manager 118 may facilitate secure monetary transactions (e.g., via PayPal™) for the users of the second user devices 132 that may have used the vehicles 102 and/or received services from the transportation resources or options 128. The third processor 134 includes a third database 140 that can store, for example, the above-described user preferences of the users of the second user devices 132 and/or, more generally, data provided by the users of the second user devices 132.

In some examples, the third database 140 stores data or information associated with and/or corresponding to travel routes and/or patterns of the users of the second user devices 132 (i.e., travel data) such as, for example, destinations and/or locations of the users of the second user devices 132 during certain time intervals. The above-described data or information is referred to herein as travel data. In some such examples, the smart parking manager 118 may automatically (e.g., periodically) receive the travel data associated with the users of the second user devices 132 and/or determine their locations via, for example, GPS data (e.g., received via a GPS locator integral with the second mobile device 132) that may be stored in the third database 140. In other examples, the smart parking manager 118 receives travel data associated with the drivers or owners of the vehicles 102 from the vehicles 102 (e.g., via the first processor 104) and/or from the first user devices 112 (e.g., via the second processor 116).

In the example system 100, the smart parking manager 118 can provide assistance, instructions and/or notifications to persons using and/or that desire use to the vehicles 102 before and/or during use of the vehicles 102. In some examples, after the users of the second user devices 132 provide requests to the smart parking manager 118 to use the vehicles 102, the smart parking manager 118 provides locations of the requested vehicles 102 and/or directions to the requested vehicles 102. For example, the smart parking manager 118 provides routes for users of the second user devices 132 (e.g., during time intervals they may be using the vehicles 102) and/or details associated with the routes. In some examples, the smart parking manager 118 automatically unlocks certain requested vehicles 102 using the first processor 104 of the vehicle and/or the second user devices 132 during time intervals in which the vehicles 102 may be permitted to be used by the users of the second user devices 132. In another example, the smart parking manager 118 notifies the users of the second user devices 132 to return the vehicles 102 (e.g., to the users of the first devices 112 and/or to the parking facilities 122) based on, in some examples, time intervals that may be associated with requests and/or reservations (e.g., of the vehicles 102 and/or of parking spots at the parking facilities 122).

In the example system 100, the parking facilities 122 can include garages and/or lots where the vehicles 102 may park. The parking facilities 122 provide parking and/or vehicle related services to the users of the first user devices 112 and/or to the users of the second user devices 132 such as, for example, parking for the vehicles 102 via parking spots and/or facilitating the use of the parking spots and/or the vehicles 102 via electronic meters, which is explained in greater detail below. The parking facilities 122 may be associated with third user devices 142 such as computers accessed by persons (e.g., owners and/or employees of the parking facilities 122). The above-described persons are referred to herein as users of the third user devices 142. Each of the third user devices 142 may include a fourth processor 144 that exchanges data and/or communicates with the smart parking manager 118 as represented by a fourth communication link 146. The users of the third user devices 142 can interact with the smart parking manager 118 via a fourth example GUI 148 of the fourth processor 144, which is explained in greater detail below in connection with FIG. 4. The smart parking manager 118 enables the users of the third user devices 142 to, in some examples, manage parking requests and/or reservations for parking spots at one or more of their parking facilities 122, enter data associated with their parking facilities 122 such as capacities of their parking facilities 122, sizes of parking spots, an ability to accommodate various vehicle sizes and/or types, etc. and view historical and/or real-time use data and/or metrics such as statuses with respect to capacity, availability and/or revenue of their parking facilities 122 and/or trends such as occupancy and/or availabilities of parking spots at different time intervals (e.g., of a historical day, month and/or year). The fourth processor 144 includes a fourth database 150 to store data such as inputs provided to the third user devices 142 and/or user preferences of owners and/or employees of the parking facilities 122 with respect to use of their parking facilities 122, such as dynamic costs or prices of certain parking spots that change during time intervals. In other examples, the fourth database 150 stores data received via sensors installed within the parking facilities 122, such as cameras, pressure sensors, etc., that may indicate attributes and/or locations of the vehicles 102 that may be using the parking facilities 122 and/or locations of the parking spots within the parking facilities 122.

Figure 1B:
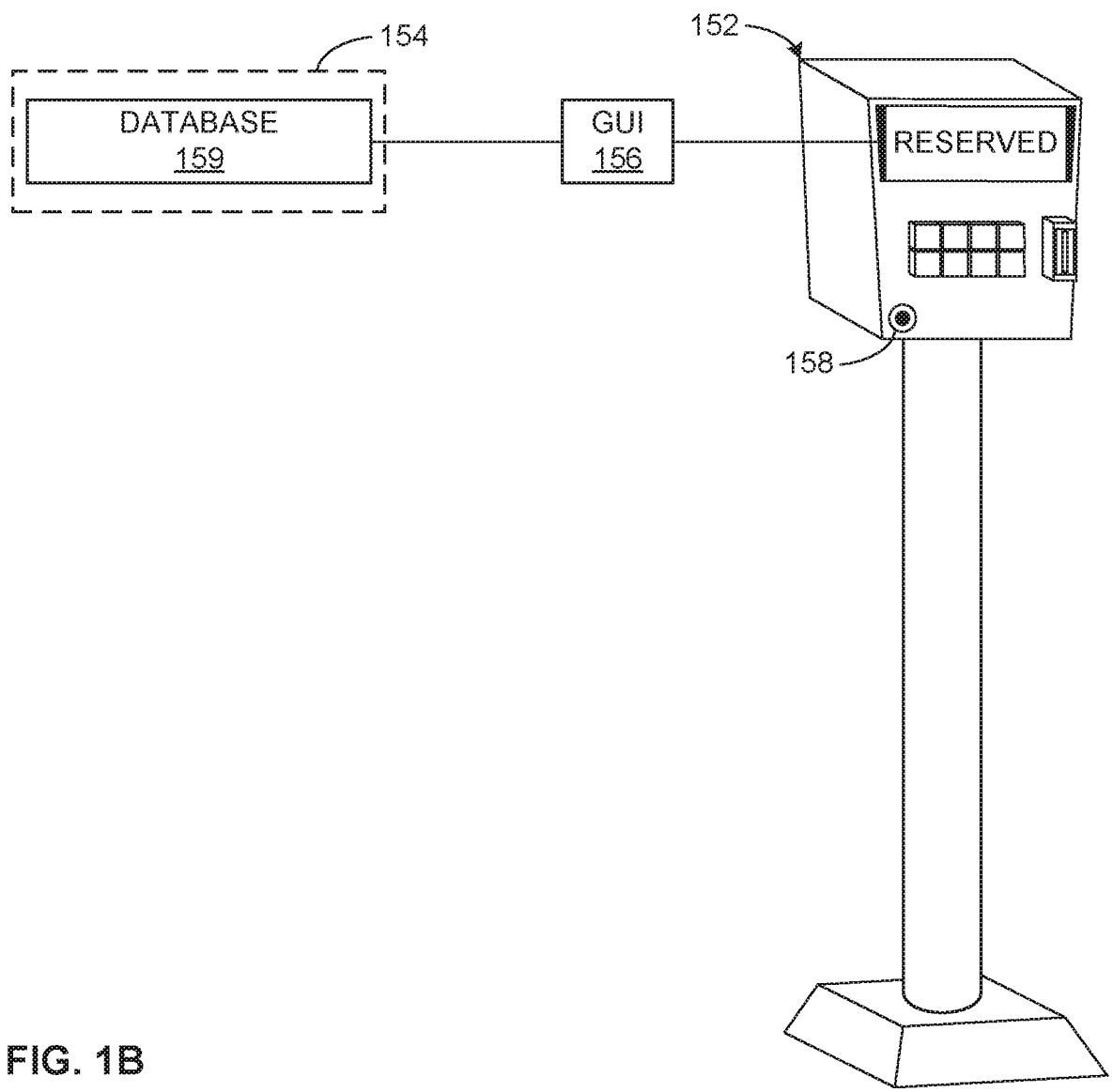
FIG. 1B illustrates an example apparatus of the example parking facility shown in FIG. 1A.

Additionally or alternatively, in some examples, as illustrated in FIG. 1B, the parking facility 122 can include one or more electronic meters 152 that may be installed on and/or included with certain parking spots within the parking facilities 122 to facilitate use of the parking spots (e.g., during reserved time intervals) by the vehicles 102 and/or the users of the first user devices 112. For example, the electronic meters 152 may be operable and/or accessible by drivers and/or owners of the vehicles 102 to reserve the parking spots for their vehicles 102 during desired or requested time intervals. In other examples, the meters 152 facilitate use of the parked vehicles 102 by other persons during the reserved time intervals. In some such examples, the electronic meters 152 can include a fifth processor 154 that may exchange data and/or communicate with the smart parking manager 118 with respect to requests and/or reservations to use the parking spots such as time intervals and/or attributes of the parking spots and/or the vehicles 102. In some examples, the users of the first user devices 112 and/or the users of the second user devices 132 may interact with the electronic meters 152 via a fifth example GUI 156 that may be integral with the electronic meters 152. In other examples, the fifth processor 154 and/or the fifth GUI 156 may not be resident within the electronic meters 152 but, instead, may be resident within kiosks or ticket dispensers (not shown) of the parking facilities 122 that are external and communicatively coupled (e.g., via wireless or wired communication) to the electronic meters 152 to facilitate use of the electronic meters 152.

In other examples, the users of the first user devices 112 and/or the users of the second user devices 132 can interact with the electronic meters 152 by using the smart parking manager 118 (e.g., via the first user devices 112 and/or the second user devices 132). In some examples, the fifth example GUI 156 can display information associated with the parking spot (e.g., via graphics, symbols, text, audio, etc.), such as time intervals during which the parking spots are available, fees or costs to use the parking spots, etc. In other examples, the electronic meters 152 include one or more sensors (e.g., a camera, a force sensor, etc.) 158 to detect and/or identify attributes of one or more of the vehicles 102 and/or the parking spots. In some such examples, the fifth processor 154 may receive data from the one or more sensors 158 of the electronic meters 152 that corresponds to the identified attributes. In some examples, the sensors 158 can identify damages of the vehicles 102 such as exterior deformations, cracks, etc. In other examples, the sensor(s) 158 and/or the fifth processor 154 identify and/or determine whether certain parked vehicles 102 have permission and/or are authorized to park in certain parking spots. In any case, the fifth processor 154 includes a fifth database 159 to store inputs or data provided by persons using the electronic meters 152 and/or store data collected or received by the one or more sensors 158.

In the example system 100, the vehicle service providers 127 can include businesses providing vehicle maintenance services such as oil changes, tire rotations, etc. that may be associated with fourth user devices 160 such as, for example, computers accessed by persons such as owners or employees of the vehicle service providers 127. Each of the fourth user devices 160 may include a sixth processor 162 that exchanges data and/or communicates with the smart parking manager 118, as represented by a fifth communication link 164. The smart parking manager 118 enables owners or employees of the vehicle service providers 127 to, in some examples, manage service requests and/or reservations provided by the users of the first user devices 112 for vehicle related services and/or enter data (e.g., via inputs to the fourth user devices 160) associated with the services provided by the vehicle service providers 127 using a sixth example GUI 166, such as an availability of services and/or an ability to accommodate the vehicles 102. The sixth processor 162 includes a sixth database 168 to store data such as inputs provided by the employees and/or owners.

In the example system 100, the smart parking manager 118 can exchange data and/or communicate with the transportation resources or options 128 such as public or private transportation systems or services (e.g., busses, trains, commercial airlines, etc.) to, in some examples, access schedules and/or information of the transportation services that may correspond to available time intervals, fees or costs and/or locations of the services, as represented by a sixth communication link 169. The transportation resources or options 128 can include on-demand vehicle providers (e.g., demand responsive transportation services) such as businesses providing dynamic shuttle buses between locations. In some such examples, the smart parking manager 118 exchanges data with the on-demand vehicle providers to enable shuttle operators (e.g., persons and/or applications executed by processors) of the on-demand vehicle service providers to manage and/or monitor requests for transportation services provided by the users of the first user devices 112 and/or the users of the second user devices 132, such as matching users to certain on-demand vehicles that may be dispatched by the on-demand vehicle providers. In other examples, the smart parking manager 118 enables the shuttle operators to monitor usage with respect to their on-demand vehicles such as an availability of the on-demand vehicles and/or an ability to accommodate persons and/or requests.

In some examples, the smart parking manager 118 provides businesses associated with the parking facilities 122 with accommodations for their services, such as the vehicle service providers 127, on-demand vehicle providers, car dealers and/or merchants providing commercial goods and/or services (e.g., dry cleaning services). In some examples, certain areas and/or parking spots of the parking facilities 122 may be designated for certain businesses or organizations and/or certain vehicles 102 that may be associated with the business (e.g., vehicles manufactured by Ford®). In other examples, the smart parking manager 118 facilitates the use of the designated areas and/or parking spots by the vehicles 102 or other customers.

In some examples the smart parking manager 118 may communicate with a proxy and/or a virtual private network (VPN) to identify and/or verify identities of the vehicles 102, the users of the first user devices 112 and/or the users of the second user devices 132 to facilitate the use of the accommodations and/or secure monetary transactions. In some examples, the smart parking manager 118 verifies whether the first processor 104, the second processor 116, the third processor 134 and/or the fourth processor 144 are allowed or permitted to use the proxy and/or VPN.

In the example system 100, a cloud computing platform 170 can include a server 172 (e.g., an Internet server) hosting the smart parking manager 118. As described above, the smart parking manager 118 exchanges data and/or communicates with user devices (e.g., the first user devices 112, the second user devices 132, the third user devices 142 and/or the fourth user devices 160) and/or the transportation options 128 via one or more wireless and/or web-based communication networks (e.g., cellular and/or satellite networks, private, local, metropolitan and/or wide area networks, other networks that may use the Internet, etc.) 174, as represented by the first communication link 114, the second communication link 120, the third communication link 136, the fourth communication link 146, the fifth communication link 164 and/or the sixth communication link 169. In some examples, the smart parking manager 118 exchanges data with the user devices such as data corresponding and/or relating to requests for parking and/or vehicle related services, availability and/or time intervals of the services, fees and/or costs of the services, attributes of the vehicles 102, availability of the vehicles 102 and/or locations of the vehicles 102, the first user devices 112 and/or the second user devices 132. In other examples, the smart parking manager 118 exchanges data and/or communicates with the transportation resources or options 128 to access or receive data relating to services such as fees or costs, time intervals, locations, directions and/or travel routes via the one or more wireless and/or web-based communication networks 174.

In the example system 100, the smart parking manager 118 receives and/or collects data relating to travel routes and/or patterns (i.e., travel data) of the vehicles 102, the users of the first user devices 112, users of the second user devices 132 and/or other persons (e.g., that may have a need for transportation and/or the vehicles 102). In some such examples, the smart parking manager 118 receives the travel data from the first user devices 112, the second user devices 132 and/or the vehicles 102. In some examples, the travel data includes time intervals and/or destinations or locations of the travel routes and/or patterns. In some examples, the vehicles 102 and/or the users of the first user devices 112 may travel (e.g., regularly) between first locations during first time intervals (i.e., first travel routes and/or patterns). In other examples, the users of the second user devices 132 may travel between second locations during second time intervals (i.e., second travel routes and/or patterns). In some such examples, the smart parking manager 118 may identify and/or determine (e.g., via calculations) compatibilities and/or correlations between the first travel routes and/or patterns and the second travel routes and/or patterns. The smart parking manager 118 may notify, based on the compatibilities and/or correlations, users of the first user devices 112 and/or the second user devices 132 with respect to the compatibilities, correlations and/or, in some examples, to availability and/or use of the vehicles 102. In some such examples, the users of the second user devices 132 may have a need for transportation that can be satisfied by the vehicles 102.

In other examples, the smart parking manager 118 receives and/or collects data related to historical use of the parking facilities 122 such as receipts (e.g., electronic receipts) of parking transactions during past or historical time intervals that may indicate historical use and/or availability of parking services at the parking facilities 122 and/or may indicate travel patterns of drivers that use the parking facilities 122. In other examples, the smart parking manager 118 receives and/or collects data related to real-time and/or historical use of the parking facilities 122 from sensors within the parking facilities 122 (e.g., pressure sensors, cameras, etc.), the vehicles 102, the first user devices 112 and/or the third user devices 142. In some such examples, the vehicles 102 and/or the first user devices 112 can detect and/or determine time intervals during which the vehicles 102 may have been parked using accelerometers of the vehicles 102 the first user devices 112 and/or other integral sensors. In some examples, the smart parking manager 118 processes the above-described data related to real-time and/or historical use to determine whether parking spots within a parking facility 122 are vacant and/or available during certain time intervals that may have been requested by persons searching and/or in need of parking services (e.g., the users of the first user devices 112). In some examples, the smart parking manager 118 predicts whether the parking spots are available (e.g., during the requested time intervals) based on the real-time and/or historical use data. For example, the smart parking manager 118 may process the historical use data to identify and/or determine parking spots at the parking facilities 122 having regular or periodic availability during historical time intervals. In some examples, a driver or owner of a vehicle 102 may provide a request (e.g., using the first processor 104 and/or a first user device 112) to the smart parking manager 118 to park their vehicle 102 during a time interval associated with and/or corresponding to the above-described regular or periodic availability. In some such examples, the smart parking manager 118 may determine and/or provide a probability or likelihood (e.g., percentages), based on the regular or periodic availability, to the driver or owner of the vehicle 102 to facilitate their decision or selection with respect to reserving a parking spot. In some examples, the smart parking manager 118 may compare the real-time use data of the parking facilities 122 with the historical use data to update the above-described predictions such as, for example, updating the probability or likelihood based on current availability of parking spots at the parking facilities 122. In other examples, the smart parking manager 118 may compare real-time traffic and/or weather data to a prediction for requests to determine whether delays related to traffic and/or weather will affect the vehicles 102 such as increase travel time to certain parking facilities 122 based on locations of the vehicles 102 (e.g., via the first processor 104).

In some examples, the smart parking manager 118 employs one or more algorithms or equations to match the users of the first user devices 112 and/or the vehicles 102 to parking spots of the parking facilities 122 that may be available for parking, which is discussed in greater detail below. In other examples, the smart parking manager 118 advantageously uses the algorithm(s) or equation(s) to match the vehicles 102 and/or the users of first user devices 112 to the users of the second user devices 132, the vehicle service providers 127 and/or to the transportation resources or options 128 based on requests and/or criteria such as, for example, requests and/or user preferences stored in the first database 108, the second database 130 and/or the third database 140.

In some examples, the smart parking manager 118 may use Equation (1) below:

$$\Sigma_{i=1}^{N}\Sigma_{v=1}^{M}c_{v,i}\cdot\Sigma_{t=1}^{T}x_{v,t,i} - w\cdot\Sigma_{i=1}^{N}\Sigma_{v=1}^{M}\Sigma_{t=1}^{T}x_{v,t,i} \quad \text{Equation (1)}$$

In the illustrated example of Equation (1) above, w is a numerical value corresponding to a weighted value (e.g., determined by the smart parking manager 118); N is a numerical value corresponding to a number of the second user devices 132; i represents numerical values that correspond to the second user devices 132; M is a numerical value corresponding to a number of the vehicles 102 and/or the first user devices 112; v represents numerical values that correspond to certain vehicles 102 and/or first user devices 112; $c_{v,i}$ represents numerical values that correspond to fees and/or costs (e.g., determined by the smart parking manager 118) to use the vehicles 102, which is explained in greater detail below; T is a numerical value corresponding to a number of time intervals associated with requests and/or reservations to use the vehicles 102; t represents numerical values that correspond to time intervals; $x_{v,t,i}$ includes Boolean values indicating whether to assign or match values of t and v to values of i (i.e., assigning or matching vehicles 102 to users of the second user devices 132); A represents vectors indicating that certain vehicles 102 v are available at the time intervals t; and U represents vectors indicating the second users devices 132 requests one of the vehicles 102 v at certain time intervals t. In some examples, Equation (1) may be subject to a first condition $\Sigma_{i=1}^{N} x_{v,t,i} \leq 1$ for $\forall$ (v, t) $\in$ A; a second condition $\Sigma_{v=1}^{M} x_{v,t,i} = 0$ for $\forall$ (i, t) $\notin$ U; and a third condition $x_{v,t,i} = x_{v,(t+1),i}$ for $\forall$(i, t) $\in$ U and (i, t+1) $\in$ U. In such examples, the first condition ensures that each of the vehicles 102 can be matched (e.g., via the smart parking manager 118) to no more than one of the users of the second user devices 132. In this example, the second condition ensures the vehicles 102 are not matched unless the users of the second user devices 132 request the corresponding vehicles 102. In this example, if one or more consecutive time intervals are matched to one of the users of the second user devices 132, the third condition ensures the consecutive time intervals correspond to no more than one of the vehicles 102. In some examples, the smart parking manager 118 may use Equation (1) above to match a vehicle 102 that may be scheduled to park at a parking facility 122 to a user of a second user device 132 that may have provided a request to the smart parking manager 118 to use the vehicle 102. In other examples, variations of Equation (1) above and/or other equations or algorithms may be advantageously used to match users of the first user devices 112 to services provided by the parking facilities 122, vehicle service providers 127 and/or transportation options 128. In some examples, the use of the above-described matching algorithm(s) or equation(s) may increase vehicle use options (e.g., renting, sharing, car-pooling, servicing, etc.) of the vehicles 102 while, in some examples, reducing fees and/or costs as much as (e.g., minimizing) that may have otherwise been required to park the vehicles 102. In other examples, revenue provided by users of the second user devices 132 (e.g., via the smart parking manager 118) is increased as much as (e.g., maximized). In other examples, revenue of the parking facilities 122 is increased as much as (e.g., maximized) by reducing an amount of unused parking spots within the parking facilities 122.

In the illustrated example of FIG. 1A, the smart parking manager 118 determines (e.g., periodically or continuously) the fees and/or costs to use the parking services at the parking facilities 122 and/or to use the vehicles 102. In some examples, the smart parking manager 118 determines the fees and/or costs based on attributes or characteristics of the vehicles 102 and/or parking spots at the parking facilities 122. For example, the fees and/or costs to use a vehicle 102 may be relatively large or small if the vehicle 102 is a particular model or type. In another example, the fees and/or costs to use a parking spot at a parking facility 122 may be relatively large if the parking spot is near an entrance or exit of the parking facility 122 and/or if the parking spot is associated with a deluxe or special section of the parking facility 122.

The smart parking manager 118 can update or adjust (e.g., periodically or continuously) the fees and/or costs based on certain criteria such as time intervals. For example, based on a certain time interval of a day (e.g., 7:00 AM-5:00 PM), the smart parking manager 118 increases and/or decreases the fees and/or costs. In another example, the smart parking manager 118 updates or adjusts the fees and/or costs while the vehicles 102 are parked. In such examples, after an initial time interval (e.g., 20 minutes), the smart parking manager 118 increases the fees and/or costs to use the parking spots. In other examples, the smart parking manager 118 updates or adjusts the fees and/or costs based on an amount of requests provided by the first user devices 112 and/or the second user devices 132. For example, the smart parking manager 118 compares an amount of requests provided by the users of the first user devices 112 to an amount of parking spots available at the parking facilities 122. If the amount of requests provided by the users of the first user devices 112 (e.g., during a time interval) exceeds the amount of parking spots available (e.g., during the time interval), the smart parking manager 118 increases the fees and/or costs to use the available parking spots. In another example, the smart parking manager 118 compares an amount of requests provided by the second user devices 132 to an amount of the vehicles 102 that are available for use. If the amount of requests provided by the second user devices 132 (e.g., during a time interval) exceeds the amount of vehicles 102 that are available (e.g., during the time interval), the smart parking manager 118 increases the fees and/or costs to use the available vehicles 102.

In other examples, the smart parking manager 118 facilitates bids provided by the users of the first user devices 112 and/or the users of the second user devices 132. In such examples, the smart parking manager 118 determines, updates and/or adjusts the fees and/or costs to use the available parking spots and/or the available vehicles 102. For example, more than one of the users of the first user devices 112 may wish or desire to use a particular parking spot (e.g., a parking spot located near an entrance or exit of a parking facility 122) during a time interval. In such examples, each of the users of the first user devices 112 may provide bids (e.g., periodically and/or in response to other bids), via the first user devices 112, to use the particular parking spot during the time interval exclusively. For example, the smart parking manager 118 determines the fees and/or costs to use the parking spot based on the highest provided bid and reserves the parking spot during the time interval for the user of the first user device 112 associated with the highest provided bid. Similarly, in other examples, more than one of the users of the second user devices 132 may wish or desire to use a particular vehicle 102 during a time interval. In such examples, each of the users of the second user devices 132 may provide bids (e.g., periodically and/or in response to other provided bids), via the second user devices 132, to use the vehicle 102 during the time interval exclusively. For example, the smart parking manager 118 determines the fees and/or costs to use the particular vehicle 102 based on the highest provided bid and may reserve the vehicle 102 during the time interval for the user of the second user device 132 associated with the highest bid. In some such examples, revenue received by the parking facilities 122 and/or the owners of the vehicles 102 is increased as much as (e.g., maximized) in response to the above-described determinations, updates and/or adjustments of the fees and/or costs provided by the smart parking manager 118.

When the smart parking manager 118 matches or identifies one or more matches between the vehicles 102 and candidate persons that may desire or need to use the vehicles 102 (e.g., the users of the second user devices 132), notifications may be sent to the vehicles 102, the first user devices 112 and/or the second user devices 132. The notifications can include data about requests and/or reservations such as requested time intervals, intended destinations, etc. In some examples, the users of the first user devices 112 can provide a response to the notification such as selecting certain candidate persons to use a vehicle 102 (e.g., via the first examples GUI 110 and/or the second example GUI 124).

While an example manner of implementing the system 100 is illustrated in FIGS. 1A and 1B, one or more of the elements, processes and/or devices illustrated in FIGS. 1A and 1B may be combined, divided, re-arranged, omitted, eliminated and/or implemented in any other way. In the example of FIGS. 1A and 1B, the smart parking manager 118 is depicted as a web-based application that is hosted by the cloud computing platform 170 (e.g., the server 172). However, any other system architecture may be used. For example, some or all of the operations of the smart parking manager 118 may be resident in the vehicles 102 (e.g., via the first processor 104), the first user devices 112, the second user devices 132, the third user devices 142 and/or the fourth user devices 160.

Further, the example cloud computing platform 170, each of the user devices (e.g., the first user devices 112, the second user devices 132, the third user devices 142 and/or the fourth user devices 160), each of the processors (e.g., the first processor 104, the second processor 116, the third processor 134, the fourth processor 144 the fifth processor 154 and/or the sixth processor 162) and/or, more generally, the example system 100 may be implemented by hardware, software, firmware and/or any combination of hardware, software and/or firmware.

Thus, any of the example cloud computing platform 170, each of the user devices (e.g., the first user devices 112, the second user devices 132, the third user devices 142, and/or the fourth user devices 160), each of the processors (e.g., the first processor 104, the second processor 116, the third processor 134, the fourth processor 144, the fifth processor 154 and/or the sixth processor 162) and/or, more generally, the example system 100 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example cloud computing platform 170, each of the user devices (e.g., the first user devices 112, the second user devices 132, the third user devices 142 and/or the fourth user devices 160), each of the processors (e.g., the first processor 104, the second processor 116, the third processor 134, the fourth processor 144, the fifth processor 154 and/or the sixth processor 162) and/or, more generally, the example system 100 is/are hereby expressly defined to include a tangible computer readable storage device or storage disk such as a memory, a digital versatile disk (DVD), a compact disk (CD), etc. storing the software and/or firmware. Further still, the example system 100 of FIGS. 1A and 1B may include one or more elements, processes and/or devices in addition to, or instead of, those illustrated in FIGS. 1A and 1B, and/or may include more than one of any or all of the illustrated elements, processes and devices.

Figure 2:
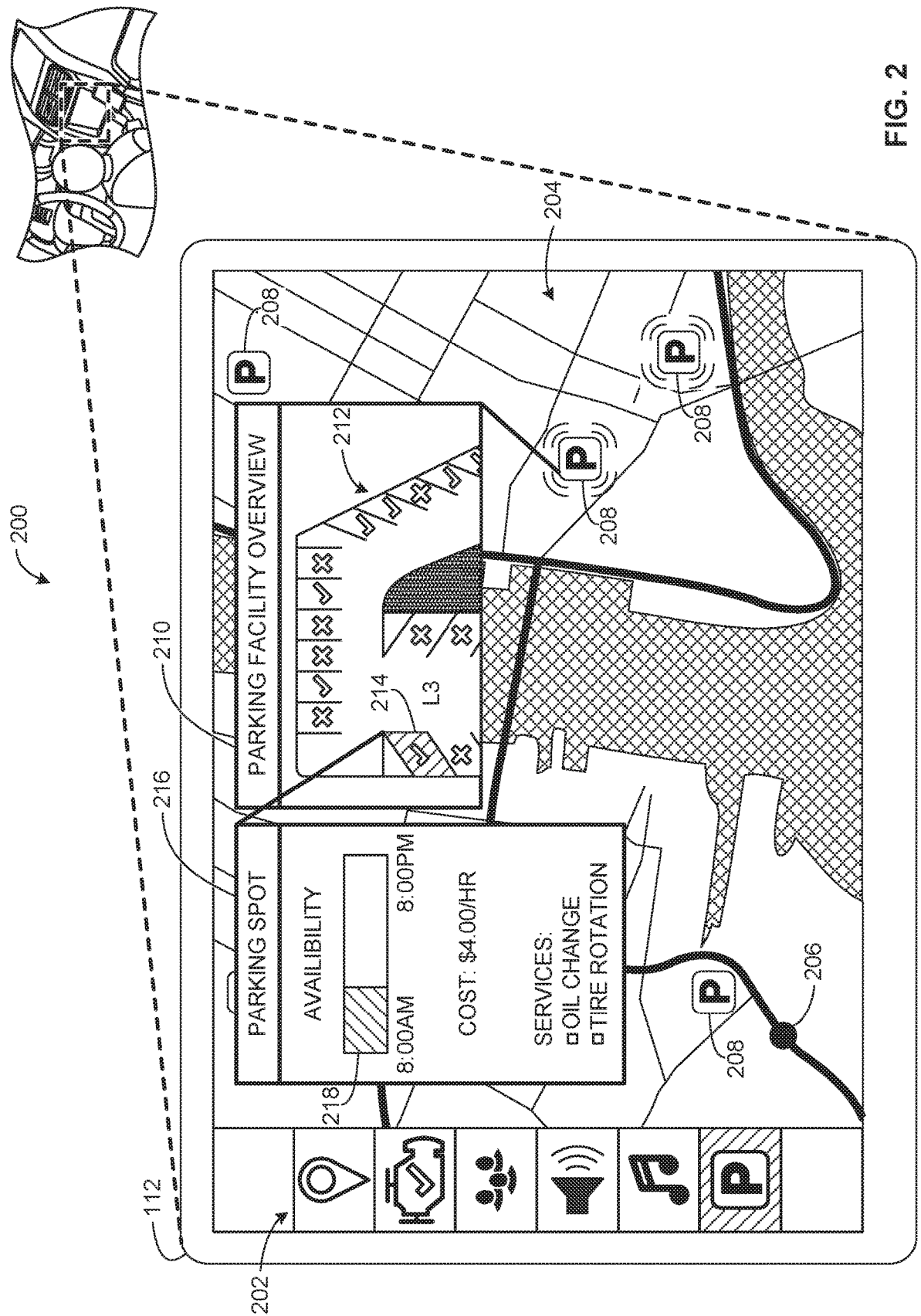
FIG. 2 illustrates an example display of an example graphical user interface associated with the example electronic devices shown in FIG. 1A.

FIG. 2 illustrates a first example screen or graphic display 200 of the first processor 104 and/or the first user devices 112 for entering or providing information or data to the smart parking manager 118 via the first example GUI 110 and/or the second example GUI 124. The first example display 200 may provide for user inputs with respect to information or data associated with requests for parking and/or vehicle related services. The users of the first user devices 112 can create or enter requests by providing one or more inputs such as via typing, talking, touching (e.g., via a screen responsive to touch) and/or other input methods. The first example display 200 may include a navigation bar 202 indicating various user applications that are accessible by the users of the first user devices 112 such as the smart parking manager 118 and/or infotainment services such as music, communication services (e.g., Instant messages, etc.) location services (e.g., maps and/or directions), etc. In this example, the first example display 200 provides a geographic image or map 204 with which the users of the first user devices 112 can interact with to survey areas (e.g., in a town or city) to identify parking facilities 122 and/or services that may be available at the parking facilities 122. The first example display 200 may include a location marker 204 indicting a location (e.g., in real-time) of one of the vehicles 102 (e.g., via GPS data). In this example, parking icons 208 indicating certain parking facilities 122 may be displayed and may correspond to specific locations of the map 204 to guide the users of the first user devices 112 to one or more of the indicated parking facilities 122. The users of the first user devices 112 may select one or more of the icons to, in some examples, view a parking facility window 210 that displays detailed information associated with the indicated parking facilities 122 such as names, addresses, business hours, parking services, etc. In some such examples, the parking facility window 210 may display a local geographic image or map 204 of the corresponding parking facility 122 to enable to the users of the first devices 112 to view specific parking spots, locations of the parking spots and/or other information associated with the parking spots (e.g., availability for parking and/or vehicle services, costs, etc.). In this example, one or more parking spots, as represented by a corresponding graphic 214, within a parking facility 122 is/are displayed via the parking facility window 210 and may include visual indicators or symbols that indicate, in some examples, an availability of the parking spots, attributes of the parking spots (e.g., parking spots designated for compact or electric vehicle use, for handicap use, for Ford® vehicle use, etc.), locations (e.g., within a garage having more than one floor), etc. In this example, the displayed graphic 214 includes a check mark symbol to indicate the corresponding parking spot(s) 214 is/are available for use by a vehicle 102. In other examples, the displayed graphic 214 may include a cross symbol to indicate the corresponding parking spot(s) 214 is/are not available. In some examples, the users of the first user devices 112 may select a displayed graphic 214 (e.g., represented by hashed lines) to view a parking spot window 216 that displays detailed information relating to the corresponding parking spot. In some examples, the parking spot window 216 may display one or more dynamic graphics 218 and/or textual information indicating an availability of the parking spot(s) (e.g., during time intervals), prices for services (e.g., parking reservations, vehicle maintenance, etc.). In other examples, additional windows may be accessible via the first example display 200 to provide detailed information or data relating to public or private transportation services, such as schedules (e.g., corresponding to busses, trains, etc.) indicating time intervals of the services, fees, costs and/or locations of the services, etc. In other examples the additional windows may provide detailed information or data relating to on-demand vehicle providers, such as on services available via dynamic shuttle buses of the on-demand demand vehicle providers. In any case, the users of the first user devices 112 can provide requests and/or data associated with the requests to receive parking and/or vehicle related services from one or more of the parking facilities 122, the vehicle service providers 127, and/or the transportation resources or options 128 via interactions with the first example display 200.

Figure 3:
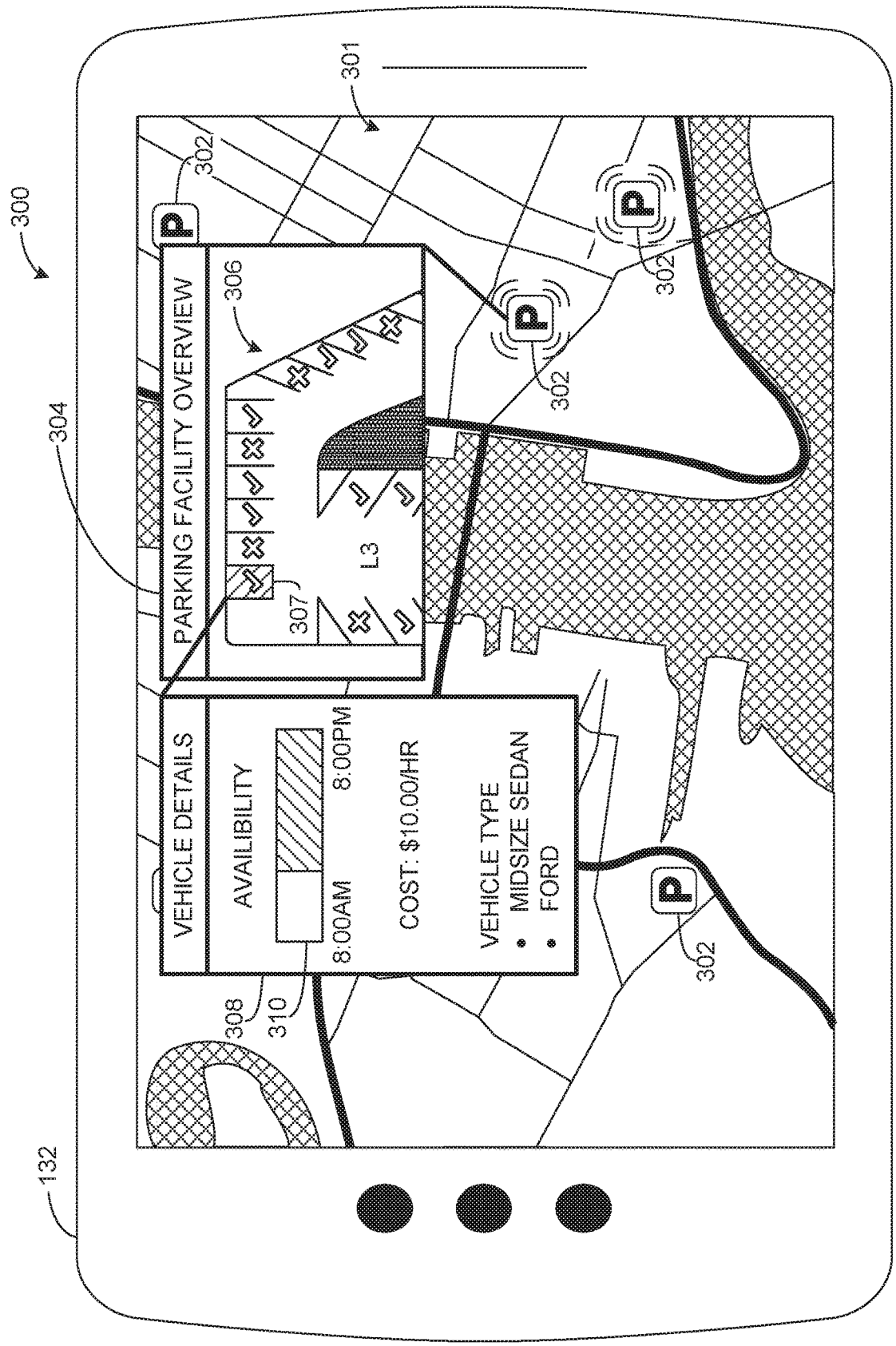
FIG. 3 illustrates an additional example display of an example graphical user interface associated with the example electronic devices shown in FIG. 1A.

FIG. 3 illustrates a second example screen or graphic display 300 of the second user devices 132 for entering or providing information or data to the smart parking manager 118 via the third example GUI 138. The second example display 300 may provide for user inputs with respect to information or data associated with parking and/or vehicle related services. The users of the second user devices 132 can create or enter requests by providing one or more inputs such as via typing, talking, touching (e.g., via a screen responsive to touch) and/or other input methods. In some examples, the second example display 300 provides a geographic image or map 301 with which the users of the second user devices 132 can interact to survey areas (e.g., in a town or city) and/or identify vehicle or parking related services that may be available at the parking facilities 122. In this example, parking icons 302 indicating parking facilities 122 may be displayed via the second example screen 300 and may correspond to locations of the map 301 to, in some examples, guide the users of the second user devices 132 to one or more of the indicated parking facilities 122. The users of the second user devices 132 may select one or more of the parking icons 302 to, in some examples, view a parking facility window 304 that displays detailed information relating to one or more parking facilities 122, such as names, addresses, business hours, parking services, etc. In some such examples, the parking facility window 304 may display a local geographic image or map 306 of the one or more corresponding parking facilities 122 to enable the users of the second user devices 132 to view the vehicles 102 that may be available for use, locations of the available vehicles 102 and/or other information or data associated with the available vehicles 102 (e.g., time intervals indicating availability, costs or fees, attributes of the vehicles, etc.). In this example, one or more parking spots and/or vehicles 102, as represented by corresponding graphics 307, within the parking facilities 122 are displayed via the parking facility window 304 and may include visual indicators or symbols that indicate, for example, an availability of the displayed vehicles 102, types (e.g., compact, electric, Ford®, etc.) of the displayed vehicles 102, locations (e.g., within a garage having more than one floor) of the displayed vehicles 102, etc. In this example, the graphics 307 include a check mark symbol to indicate the corresponding vehicles 102 are available for use. In other examples, the displayed graphics 307 may include a cross symbol to indicate the corresponding vehicles 102 are not available. In some examples, the users of the second user devices 132 may select a displayed graphic 307 (e.g., represented by hashed lines) to view a vehicle window 308 that, in some examples, displays detailed information or data relating to the corresponding vehicle 102. The vehicle window 308 may display one or more dynamic graphics 310 and/or textual information indicating, in some examples, an availability of a vehicle 102 (e.g., during time intervals), fees or costs for renting and/or using the vehicle 102. In other examples, additional windows may be accessible via the second example display 300 to provide detailed information or data relating to public or private transportation services, such as schedules (e.g., corresponding to busses, trains, etc.) indicating time intervals of the services, fees, costs and/or locations of the services, etc. In other examples the additional windows may provide detailed information or data relating to on-demand vehicle providers, such as dynamic shuttle buses of the on-demand demand vehicle providers 102 that may be available. In any case, the users of the first user devices 112 can provide requests and/or data associated with the requests to receive parking and/or vehicle related services from one or more of the parking facilities 122, the vehicle service providers 127, and/or the transportation resources or options 128 via interactions with the second example display 300.

Figure 4:
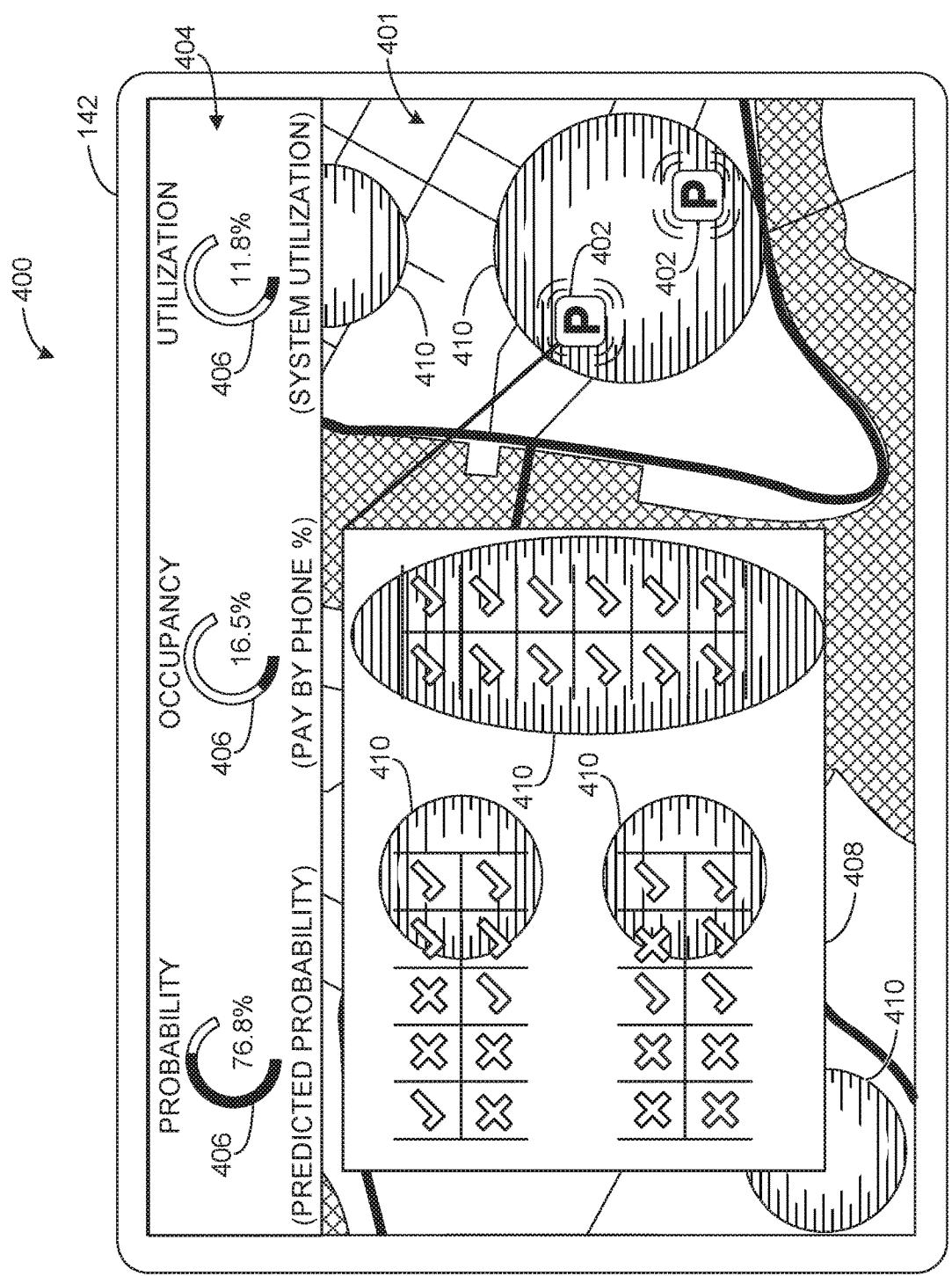
FIG. 4 illustrates an additional example display of an example graphical user interface associated with the example electronic devices shown in FIG. 1A.

FIG. 4 illustrates a third example screen or graphic display 400 of the third user devices 142 for entering or providing data/information to the smart parking manager 118 via the fourth example GUI 148. The third example display 400 may provide for user inputs with respect to information or data associated with monitoring and/or managing parking and/or vehicle related services at one or more of the parking facilities 122. In some examples, the third example display 400 provides a geographic image or map 401 with which the users of the third user devices 142 can interact to survey areas to view parking facilities 122 and/or monitor metrics relating to parking and/or vehicle services at the parking facilities 122 such as real-time and/or historical occupancies or availabilities, revenue, etc. In this example, parking icons 402 indicating certain parking facilities 122 may be displayed and may correspond to specific locations of the map 401. The users of the third user devices 142 may select one or more of the parking icons 402 to, in some examples, view data relating certain parking facilities 122. The third example display 400 may include a heads up display (HUD) 404 to provide dynamic graphics or symbols 406 to enable the users of the third user devices 142 to view metrics while (e.g., simultaneously) surveying the geographic image or map 401 and/or providing inputs to the third user devices 142. For example, the users of the third user devices 142 may view the parking facilities 122 in an interactive window 408 to provide data such as prices or costs of certain parking spots and/or preferences with respect to varying (e.g., at different times intervals) costs and/or prices for the parking spots. In this example, the geographic image or map 401 includes cluster and/or heat map graphics 410 corresponding to an amount of traffic or use of the parking facilities 122 to further facilitate the monitoring and/or managing by the users of the third user devices 142.

Flowcharts representative of example methods for implementing the example system 100 of FIGS. 1A and 1B are shown in FIGS. 5-8. In this example, the methods may be implemented using machine readable instructions that comprise a program for execution by a processor such as the processor 912 shown in the example processor platform 900 discussed below in connection with FIG. 9. The program may be embodied in software stored on a tangible computer readable storage medium such as a CD-ROM, a floppy disk, a hard drive or a memory associated with the processor 912, but the entire program and/or parts thereof could alternatively be executed by a device other than the processor 912 and/or embodied in firmware or dedicated hardware. Further, although the example program is described with reference to the flowcharts illustrated in FIGS. 5-8, many other methods of implementing the example system 100 may alternatively be used. For example, the order of execution of the blocks may be changed, and/or some of the blocks described may be changed, eliminated, or combined.

As mentioned above, the example processes of FIGS. 5-8 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 5-8 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 5:
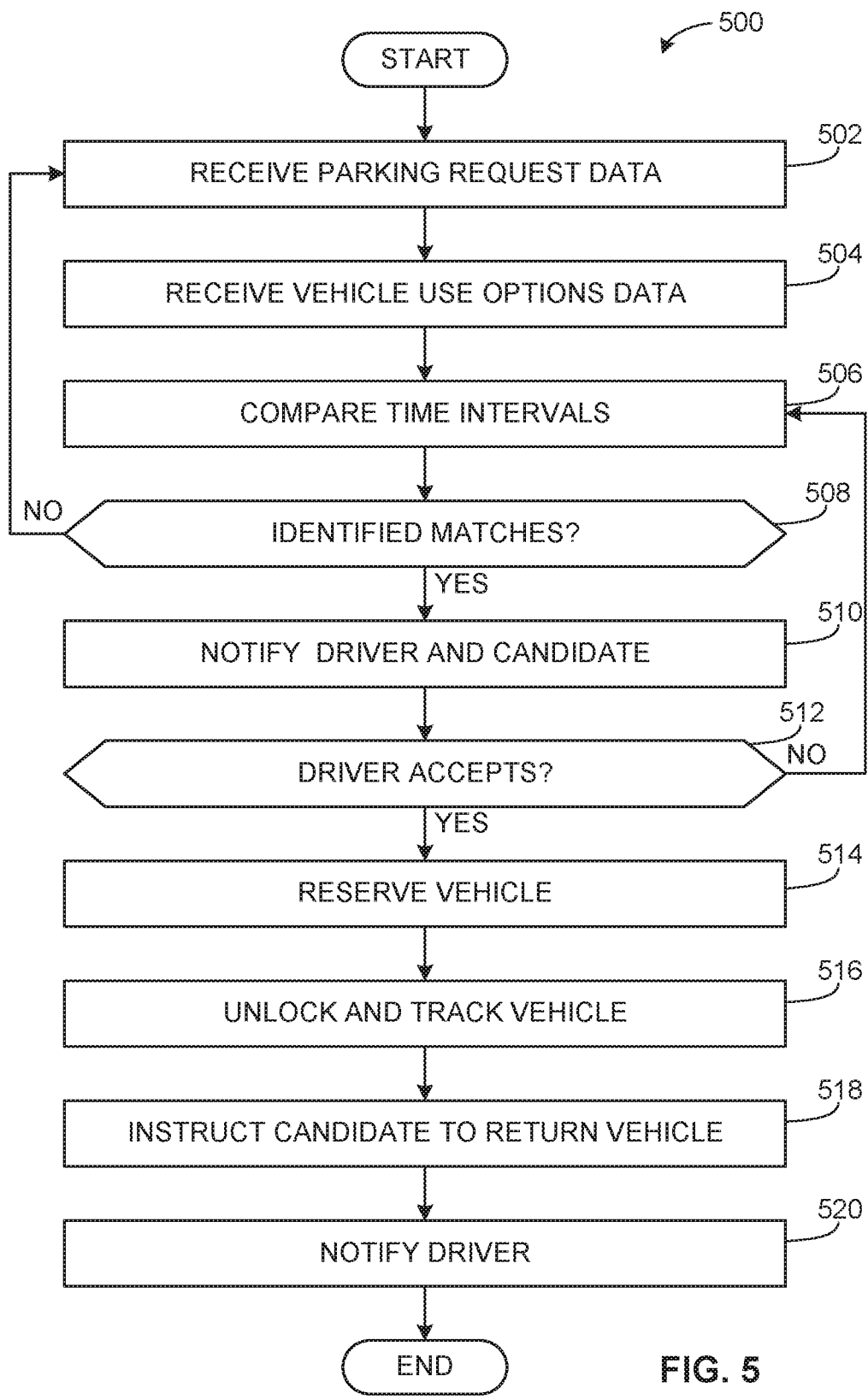
FIG. 5 is a flow diagram of an example method that may be executed to implement the example system shown in FIG. 1A.

FIG. 5 illustrates a flowchart representative of an example method 500 that can be implemented to automatically provide parking and/or vehicle related services to persons requesting and/or having needs for the services. The example method 500 can be implemented using the smart parking manager 118 and, in some examples, the vehicles 102, one more of the user devices (e.g., the first user devices 112, the second user devices 132, the third user devices 142 and/or the fourth user devices 160), the parking facilities 122 and/or the vehicle service providers 127 shown in FIGS. 1A and 1B. The example method 500 begins at block 502 by receiving, via the smart parking manager 118, information or data from one or more of the first user devices 112 and/or the vehicles 102 that is associated with requests for parking and/or vehicle related services provided by the parking facilities 122 and/or the vehicle service providers 127. For example, a driver or owner of a vehicle 102 may provide a request (e.g., using the first processor 104 and/or a first user device 112) to park their vehicle 102 at one of the parking facilities 122 during a time interval in which they may not be using their vehicle 102. In some examples, the driver or owner may provide a request to have their vehicle 102 serviced by one or more vehicle service providers 127 that may be at and/or near the parking facility 122, such as having their vehicle 102 receive an oil change and/or a tire rotation by one or more employees or owners. In some examples, the above-described information or data includes time intervals desired and/or requested by the driver or owner, attributes of their vehicle 102, locations of their vehicle 102, their user preferences and/or information or data that is stored on the first database 108 and/or the second database 130. In some such examples, the information or data indicates whether their vehicle 102 is permitted to be used by one or more persons (e.g., the users of the second user devices 132 and/or the users of fourth user devices 160). In some examples, the information or data may include user preferences (e.g., stored in the first database 108 and/or the second database 130, etc.) with respect to use of their vehicle 102 such as requiring their vehicle 102 to remain within a certain distance of a location during one or more time intervals and/or certain fees or costs to use their vehicle 102.

In some examples, the smart parking manager 118 receives information or data from the users of the third user devices 142 and/or, more generally, from the parking facilities 122 relating to their parking services. For example, the users of the third user devices 142 can provide data corresponding to availability (e.g., time intervals), locations and/or attributes of parking spots and/or certain vehicles 102 within the parking facilities 122. In other examples, the users of the third user devices 142 can provide data corresponding to fees or costs to use certain parking services.

In some examples, the smart parking manager 118 receives the above-described data or information from one or more electronic meters 152 that may be installed or employed within one or more of the parking facilities 122. For example, a driver or owner of a vehicle 102 interacts with an electronic meter 152 (e.g., via the fifth example GUI 156) to enter the information or data. In other examples, sensors installed on the electronic meters 152 and/or within the parking facilities 122 receive and/or collect data or information corresponding to attributes of the vehicles 102 and/or parking spots within the parking facilities 122. In such examples, the smart parking manager 118 may identify the attributes of the vehicles 102 and/or the parking spots within the parking facilities 122 based on the data or information received and/or collected from the sensors.

Additionally or alternatively, in some examples, the users of the first user devices 112 and/or the users of the third user devices 142 provide information or data to the smart parking manager 118 that may be needed or required by the smart parking manager 118 to employ one or more matching algorithms or equations at 506.

At block 504, the smart parking manager 118 receives information or data (e.g., time intervals, locations, costs or fees, etc.) associated with vehicle use options such as renting the vehicles 102 to other drivers that may request or desire to use the vehicles 102 and/or servicing the vehicles 102 via the vehicle service providers 127. The smart parking manager 118 may receive this information or data from candidate persons, such as the users of the second user devices 132 having a need to use (e.g., rent, share or car-pool, etc.) the vehicles 102, via the second user devices 132 and/or from candidate vehicle service providers 127 that desire to provide vehicle related services to the vehicles 102 via the fourth user devices 160. For example, a person using one of the second user devices 132 may provide a request to use one of the vehicles 102 during a time interval. In another example, an employee or owner of a parking facility 122 may use one of the fourth user devices 160 to enter data corresponding to an availability and/or details of their provided vehicle services such as time intervals and/or fees or costs.

Additionally or alternatively, in some examples, the users of the second user devices 132 and/or the users of the fourth user devices 160 provide information or data to the smart parking manager 118 that may be needed or required by the smart parking manager 118 to employ one or more matching algorithms or equations at 506.

At block 506, the smart parking manager 118 performs comparisons of time intervals corresponding to the data received at block 502 with time intervals corresponding to the data received at block 504. In some examples, the smart parking manger 118 employs one or more of the above-described matching algorithms or equations to match the vehicles 102 to one or more vehicle use options, such as users of the second user devices 132 that desire or request to use the vehicles 102, the vehicle service providers 127 (e.g., users of the fourth user devices 160) and/or, in other words, candidate persons to use the vehicles 102. For example, based on the comparisons, the smart parking manager 118 matches a user of a second user device 132 and/or a user of a fourth user device 160 having a desire or need to use the vehicle 102 during a first time interval to a second time interval associated with the driver or owner parking their vehicle 102 at a parking facility 122. In some examples, the first time interval may be contained entirely within the second time interval and/or, in other words, the user of the second user device 132 and/or the user of the fourth user device 160 can use the vehicle 102 during a time in which an owner or driver of vehicle 102 is not using their vehicle 102. In other examples, the smart parking manager 118 matches the vehicles 102 to the users of the second user devices 132 based on a cost to use the vehicles 102, attributes of the vehicles 102 identified via the smart parking manager 118, attributes of parking spots within the parking facilities 128 identified via the smart parking manager 118 and/or user preferences stored on the first database 108, the second database 130 and/or the third database 140.

At block 508, the smart parking manager 118 determines whether one or more matches were identified at block 506. If the smart parking manager 118 determines that one or more matches were identified at block 506, control proceeds to block 510, otherwise control returns to block 502 (i.e., if no matches were identified).

At block 510, the smart parking manager 118 notifies the requesting drivers or owners of the vehicles 102 with respect to the one or more matches at block 506, such as by providing information or data relating to the matches via the first processor 104 and/or the first user devices 112. This provided information may be associated with the candidate persons and/or vehicle service providers 127 such as an identification of the persons, an intended use of the vehicles 102 (e.g., intended destinations) and/or one or more time intervals corresponding to the intended use. More generally, the smart parking manager provides information or data to the drivers or owners of the vehicles 102 that may be necessary to enable the drivers or owners to provide an informed response and/or a decision or selection with respect to allowing or permitting the matched candidate persons to use their vehicles 102. The smart parking manager 118 may receive the response and/or selection from the drivers or owners via the first processor 104 and/or the first user devices 112.

At block 512, if the smart parking manager 118 determines that at least one driver or owner of a vehicle 102 selected, in response to the notification at block 510, one or more candidate persons to use and/or service their vehicles 102, control proceeds to block 514, otherwise control returns to block 506.

At block 514, the smart parking manager 118 reserves a vehicle 102 (e.g., using an electronic meter 152) for the selected candidate person(s) during a time interval requested by the selected person(s) (e.g., during a first time interval) and/or during a time interval requested by the driver or owner of the vehicle 102 (e.g., during a second time interval). In some examples, the smart parking manager 118 provides detailed information or data to the driver or owner of the vehicle 102 and/or the selected person(s) with respect to the reservation of the vehicle 102, such as times, locations, preferences, etc.

At block 516, the smart parking manager 118 unlocks and tracks the vehicle 102 during the time interval requested by the selected person(s) (e.g., the first time interval) and/or during the time interval requested by the driver or owner of the vehicle 102 (e.g., the second time interval) via, in some examples, the first processor 104, the second user devices 132 and/or the fourth user devices 160. In some examples, positions and/or destinations of the vehicle 102 are recorded by the smart parking manager 118 (e.g., during the first time interval and/or the second time interval) via the first processor 104 (e.g., using the GPS locator 106), the second user devices 132 and/or the fourth user devices 160.

At block 518 the smart parking manager 118 instructs the selected person(s) using and/or servicing the vehicle 102 to return the vehicle 102 to the owner of the vehicle 102 and/or to a parking facility 122 for continued use by the owner. In some examples, the smart parking manager 118 notifies the selected person(s) via the first processor 104, the second user devices 132 and/or the third user devices 142. In such examples, the notification may be based on the first time interval and/or the second time interval. In other examples, the smart parking manager 118 determines a location and/or a travel time associated with returning the vehicle that may be based on traffic conditions (e.g., in real-time) and/or the location of the vehicle 102 and notifies the selected person(s) using or driving the vehicle 102 based on the determined location and/or travel time.

At block 520 the smart parking manager 118 notifies the driver or owner of the vehicle 102 that their vehicle 102 was returned to the parking facility 122. In other examples, the smart parking manager 118 notifies the driver or owner of the vehicle 102 with respect to a status of their vehicle 102, such as whether their vehicle was damaged (e.g., via sensors of the parking facilities 122) during a time when the driver or owner was not using their vehicle 102.

Figure 6:
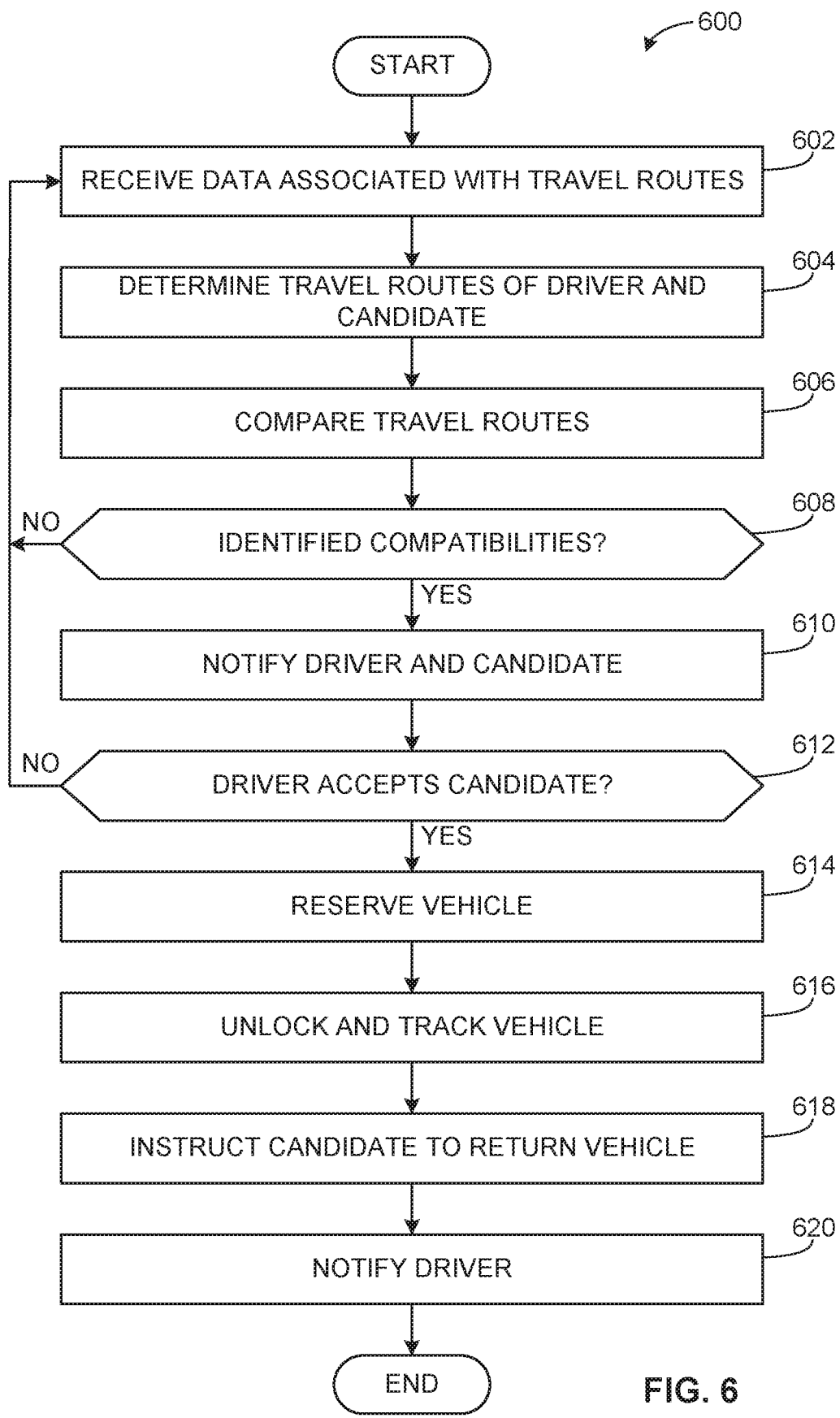
FIG. 6 is a flow diagram of another example method that may be executed to implement the example system shown in FIG. 1A.

FIG. 6 illustrates a flowchart representative of another example method 600 that can be implemented to automatically provide parking and/or vehicle related services to persons requesting and/or having needs for the services. The example method 600 can be implemented using the smart parking manager 118 and, in some examples, the vehicles 102, the first user devices 112 and/or the second user devices 132 shown in FIG. 1A. The example method 600 begins at block 602 by receiving, via the smart parking manager 118, information or data associated with and/or corresponding to travel routes and/or patterns of the vehicles 102, the drivers or owners of the vehicles 102 (e.g., the users of the first user devices 112) and/or candidate persons (e.g., the users of the second user devices 132) that may have a need or desire to use the vehicles 102. This data includes, for example, locations (e.g., at destinations and/or between destinations) associated with the vehicles 102, the first user devices 112 and/or the second user devices 132 and/or time intervals relating to the locations. In some examples, this data is provided to the smart parking manager 118 by the vehicles 102 (e.g., via the first processor 104), the first user devices 112 and/or the second user devices 132. In other examples, this data is provided to the smart parking manager 118 by the parking facilities 122, the vehicle service providers 127 and/or other sources of information or data corresponding to the above-described travel routes and/or patterns.

At block 604, the smart parking manager 118 processes the information or data received at block 602 to identify and/or determine the above-described travel routes and/or patterns. In some examples, the travel routes and/or patterns are pre-determined (e.g., by persons or processors that are not associated with the smart parking manager 118) and are provided to the smart parking manager 118. The smart parking manager may determine time intervals relating to the travel routes and/or patterns of the drivers or owners of the vehicles 102 and/or of the users of the second user devices 132. For example, the smart parking manager 118 determines a vehicle 102 parks at a parking facility 122 periodically or regularly during a time interval (e.g., 8:00 AM-5:00 PM). Continuing with this example, the smart parking manager 118 determines a user of a second user device 132 travels to a location (e.g., near the parking facility 122) periodically or regularly during another time interval (e.g., 12:00 PM-6:00 PM).

At block 606 the smart parking manager 118 compares some of the travel routes and/or patterns determined and/or received at block 604 with the other of the travel routes and/or patterns to, in some examples, calculate correlations between the compared travel routes and/or patterns and/or determine matches and/or compatible travel routes and/or patterns. For example, a first travel route and/or pattern associated with a driver or owner of a vehicle 102 (e.g., a user of a first user device 112) are compared with a econd travel route and/or pattern of a candidate person (e.g., a user of a second user device 132) that may have a need for the vehicle 102. In this example, the driver or owner of the vehicle 102 travels (e.g., regularly) to a first destination or location and parks their vehicle 102 during a time interval. Continuing with this example, the candidate having a need for transportation and/or the vehicle 102 travels (e.g., regularly) to a second destination or location that may be within close proximity of the first destination or location during the time interval. In this example, the first travel route and/or pattern of the owner or driver of the vehicle 102 correlates and/or is compatible with the second travel route and/or pattern of the candidate person having a need for transportation.

At block 608, the smart parking manager 118 determines whether two or more travel routes and/or patterns compared at block 606 correlate and/or are compatible. If the smart parking manager 118 determines that two or more travel routes and/or patterns were identified as correlating and/or compatible at block 606, control proceeds to block 610, otherwise control returns to block 602.

At block 610 the smart parking manager 118 notifies the drivers or owners of the vehicle 102 and/or the candidate persons that may have a need for transportation with respect to their corresponding travel routes and/or patterns, such as by providing information or data relating to an identification of the candidate persons, an intended use of the vehicles 102 (e.g., intended destinations) by the candidate persons and/or time intervals corresponding to the intended use. In some examples, the smart parking manager 118 may provide notifications with respect to allowing or permitting the candidate persons to use the vehicles 102 to satisfy their need for transportation. In some such examples, the smart parking manager 118 provides the above-described notifications via the first processor 104, the first user devices 112 and/or the second user devices 132. More generally, the smart parking manager provides notifications including information or data to the drivers or owners of the vehicles 102 that may be necessary to enable the drivers or owners to provide an informed response and/or a decision or selection with respect to allowing or permitting the matched candidate persons to use their vehicles 102. The smart parking manager 118 may receive the response and/or selection from the drivers or owners via the first processor 104 and/or the first user devices 112.

At block 612, if the smart parking manager 118 determines that at least one driver or owner of a vehicle 102 selected, in response to the notification at block 610, one or more candidate persons to use their vehicles 102, control proceeds to block 614, otherwise control returns to block 602.

At block 614, the smart parking manager 118 reserves the vehicle 102 of the driver or owner for the selected candidate person(s) during a time interval associated with the travel routes and/or patterns (e.g., during a time when the vehicle is not otherwise used by the owner). In some examples, the smart parking manager 118 provides detailed information or data to the driver or owner of the vehicle 102 and/or to the selected individual(s) or person(s) and/or the vehicle service provider(s) 127 with respect to the reservation of the vehicle 102, such as times, locations, preferences, etc.

At block 616, the smart parking manager 118 unlocks and tracks the vehicle 102 during the reserved time interval for the selected person(s) via, in some examples, the first processor 104 and/or the second user devices 132. In some examples, positions and/or destinations of the vehicle 102 are recorded by the smart parking manager via the first processor 104 (e.g., using the GPS locator 106) and/or the second user devices 132.

At block 618 the smart parking manager 118 instructs the selected person(s) using the vehicle 102 to return the vehicle 102 to the owner of the vehicle 102 and/or to a parking facility 122 for continued use by the owner. In some examples, the smart parking manager 118 notifies the selected person(s) via the first processor 104 and/or the second user devices 132. In such examples, the notification may be based on the reserved time interval. In other examples, the smart parking manager 118 determines a travel time associated with returning the vehicle 102 that may be based on traffic conditions (e.g., in real-time) and notifies the individual using or driving the vehicle 102 based on the travel time.

At block 620 the smart parking manager 118 notifies the driver or owner of the vehicle 102 that, in some examples, their vehicle 102 was returned to a certain parking facility 122. In other examples, the smart parking manager 118 notifies the driver or owner of the vehicle 102 with respect to a status of their vehicle 102, such as whether their vehicle 102 was damaged (e.g., via sensors of the parking facilities 122) during a time interval the owner or driver was not using their vehicle 102.

Figure 7:
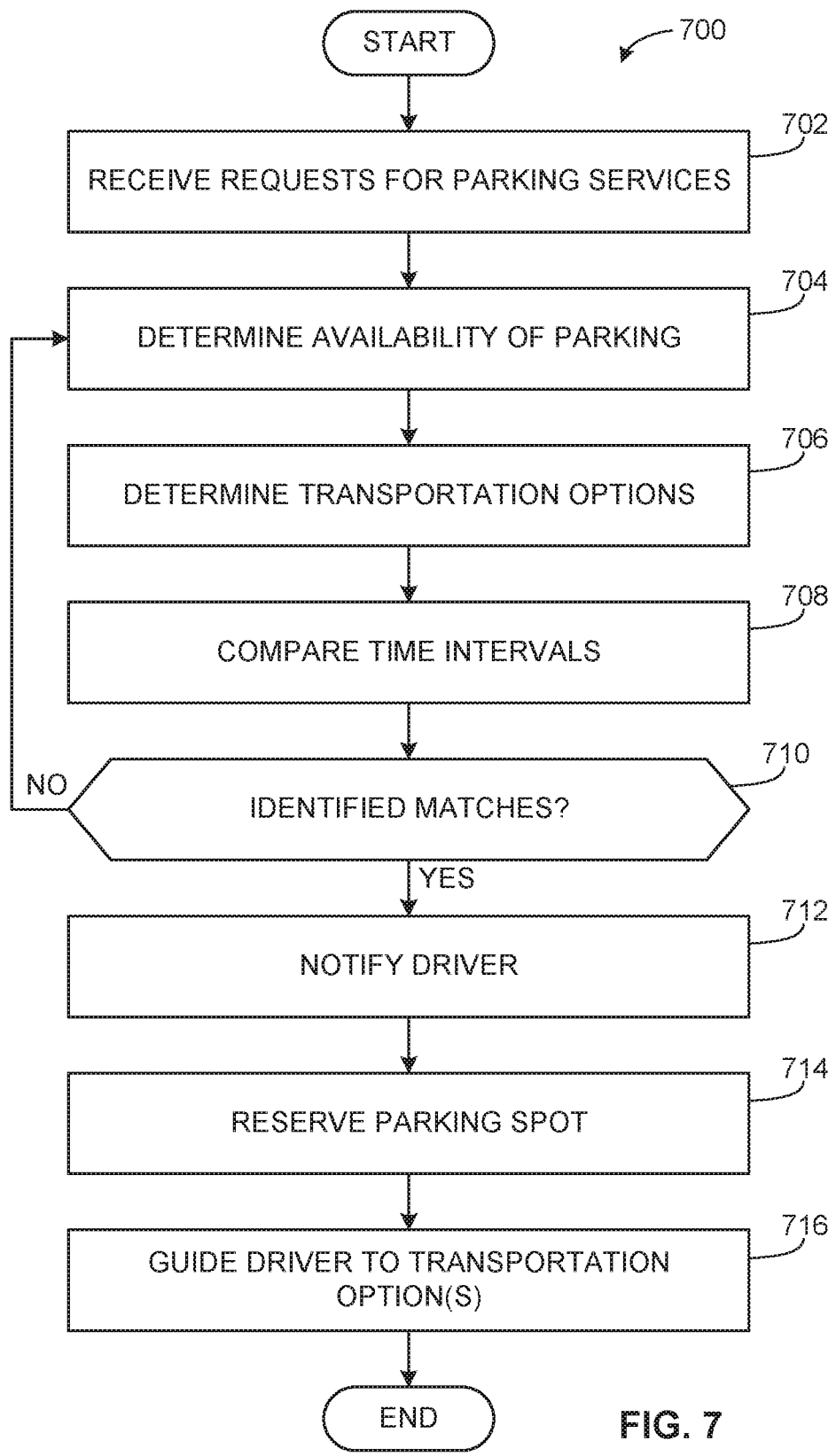
FIG. 7 is a flow diagram of another example method that may be executed to implement the example system shown in FIG. 1A.

FIG. 7 illustrates a flowchart representative of another example method 700 that can be implemented to automatically provide parking and/or vehicle related services to persons requesting and/or having needs for the services. The example method 700 can be implemented using the smart parking manager 118 and, in some examples, the vehicles 102, the user devices (e.g., first user devices 112, the second user devices 132 and/or the third user devices 142) and/or one or more of the parking facilities 122 shown in FIGS. 1A and 1B. The example method 700 begins at block 702 by receiving data associated with requests from drivers or owners of the vehicles 102 having a need for parking and/or vehicle related services, such as parking their vehicles 102 during a time interval and/or receiving vehicle or transportation services from one or more of the transportation resources or options 128 (e.g., after parking their vehicles 102 at the parking facilities 122) during the time interval. For example, a driver or owner (e.g., a person) of a vehicle 102 may provide a request (e.g., via the first processor 104 and/or a first user device 112) to park their vehicle 102 at a parking facility 122 during a certain time interval. In some examples, the driver or owner may provide a request to receive vehicle and/or transportation services from one or more of the transportation resources or options 128 during the time interval such as using a public train and/or commercial airline after parking their vehicle 102 and/or using a dynamic shuttle bus to travel to the commercial airline and/or to the parking facility 122 (e.g., after returning from the commercial airline). In some examples, the above-described information or data includes time intervals desired and/or requested by the drivers or owners of the vehicles 102, locations of the drivers or owners and/or their vehicles 102, their user preferences and/or information or data that may be stored on the first database 108 and/or the second database 130.

In some examples, the smart parking manager 118 receives the above-described data or information from one or more electronic meters 152 that may be installed or employed within one or more of the parking facilities 122. For example, a driver or owner of a vehicle 102 interacts with an electronic meter 152 (e.g., via the fifth example GUI 156) to enter the information or data.

In some examples, the smart parking manager 118 receives information or data from the users of the third user devices 142 and/or, more generally, the parking facilities 122 relating to their parking services. For example, the users of the third user devices 142 can provide data corresponding to availability, locations and/or attributes of parking spots. In other examples, the users of the third user devices 142 can provide data corresponding to fees or costs to use certain parking services.

Additionally or alternatively, in some examples, the users of the first user devices 112 and/or the users of third user devices 142 provide information or data to the smart parking manager 118 that may be needed or required by the smart parking manager 118 to employ one or more matching algorithms at block 708.

At block 704, the smart parking manager 118 determines availability of parking services at one or more of the parking facilities 122 via analyzing or processing the data received at block 702. In some examples, the smart parking manager determines whether parking spots within the parking facilities can satisfy the needs of the drivers or owners of the vehicles 102 to park their vehicles during their requested time intervals.

At block 706, the smart parking manager 118 identifies and/or determines whether one or more candidate transportation resources or options 128 may be available to satisfy the need of the drivers or owners of the vehicles 102 for their transportation or vehicle related services. In some examples, the smart parking manager 118 receives information or data corresponding to time intervals, locations, costs or fees and/or more generally, information or data associated with the transportation resources or options 128 such as schedules or details of certain public or private busses, trains, commercial airlines, etc. that may be necessary to receive services provided by the transportation resources or options. The smart parking manager 118 may receive this information or data from the candidate transportation resources or options 128 via the one or more wireless and/or web-based communication networks 174. In other examples, the smart parking manager 118 sends some or all of the information or data received at block 702 and/or the determinations made at block 704 to one or more on-demand vehicle providers that may provide transportation or vehicle related services, such as dynamic shuttle busses to accommodate or satisfy the need for transportation or vehicle related services of the drivers or owners of the vehicles 102, that may be required by the on-demand vehicle providers to decide whether they can provide on-demand vehicles. For example, the smart parking manager 118 provides the on-demand vehicle providers with time intervals that the drivers or owners of the vehicles 102 require transportation or vehicle related services and/or other associated information or data such as locations of the vehicles 102 and/or user preferences of the drivers or owners of the vehicles 102 (e.g., stored on the first database 108 and/or the second database 130).

At block 708, the smart parking manager 118 performs comparisons of time intervals corresponding to the determinations made at block 704 with time intervals corresponding to the determinations made at block 706. In some examples, the smart parking manager 118 employs one or more of the above-described matching algorithms to match drivers or owners of the vehicles 102 (e.g., the users of the first user devices 112) to transportation resources or options 128. For example, the smart parking manager 118 may match a driver or owner of a vehicle 102 corresponding to a first time interval to a transportation or vehicle related service provided by one or more of the transportation resources or options 128 that corresponds to a second time interval. In such examples, the second time interval may be contained entirely within the first time interval. For example, the driver or owner of the vehicle 102 may use services provided by the transportation resource(s) or option(s) 128 during a time interval when the driver or owner is not using their vehicle 102 (e.g., when the driver or owner of the vehicle 102 is traveling to and/or from a parking facility 122). In other examples, the smart parking manager 118 matches the driver or owner of the vehicle 102 to the transportation resource(s) or option(s) based on fees, costs and/or user preferences stored in the first database 108, the second database 130. In other examples, the smart parking manager 118 matches the driver or owner of the vehicle 102 to the transportation resource(s) or option(s) 128 based on a location of the driver or owner (e.g., via the first processor and/or a first user device 112) and/or based on a location of the transportation resource(s) or option(s) 128. For example, the driver or owner of the vehicle may be near a certain transportation resource or option 128 such as a public bus or train station.

At block 710, the smart parking manager 118 determines whether one or more matches were identified at block 708. If the smart parking manager 118 determines that one or more matches were identified at block 708, control proceeds to block 712, otherwise control returns to block 704 (i.e., if no matches were identified).

At block 712, the smart parking manager 118 notifies requesting drivers or owners of the vehicles 102 with respect to the one or more matches at block 708, such as by providing information or data relating to the matches via the first processor 104 and/or the first user devices 112. This provided information may be associated with the candidate transportation resources or options 128 such as identification of the transportation resources or options 128, travel routes and/or fees or costs to use services of the transportation resources or options 128. More generally, the smart parking manager 118 provides information or data to the drivers or owners of the vehicles 102 that may enable the drivers or owners to provide an informed response and/or a decision or selection with respect to using one or more of the transportation resources or options 128. The smart parking manager 118 may receive the response and/or selection from the drivers or owners via the first processor 104 and/or the first user devices 112 including a decision or selection with respect to receiving parking services from the parking facilities 122 and/or receiving transportation or vehicle related services from the transportation options or resources 128.

At block 714, the smart parking manager 118 reserves parking spots at the parking facilities (e.g., using the electronic meters 152) to satisfy the needs of the drivers or owners of the vehicles 102 for parking services. In some examples, the smart parking manager 118 provides detailed information or data to the drivers or owners of the vehicles 102 with respect to their reservations for the parking spots such as time intervals, locations, fees or costs, user preferences, etc.

At block 716 the smart parking manager 118 guides or directs the drivers or owners of the vehicles 102 to the selected transportation options or resources 128 (e.g., via the first user devices 112). In other examples the smart parking manager 118 guides or directs the drivers or owners of the vehicles 102 to parking facilities 122 to receive their needed or desired parking services.

Figure 8:
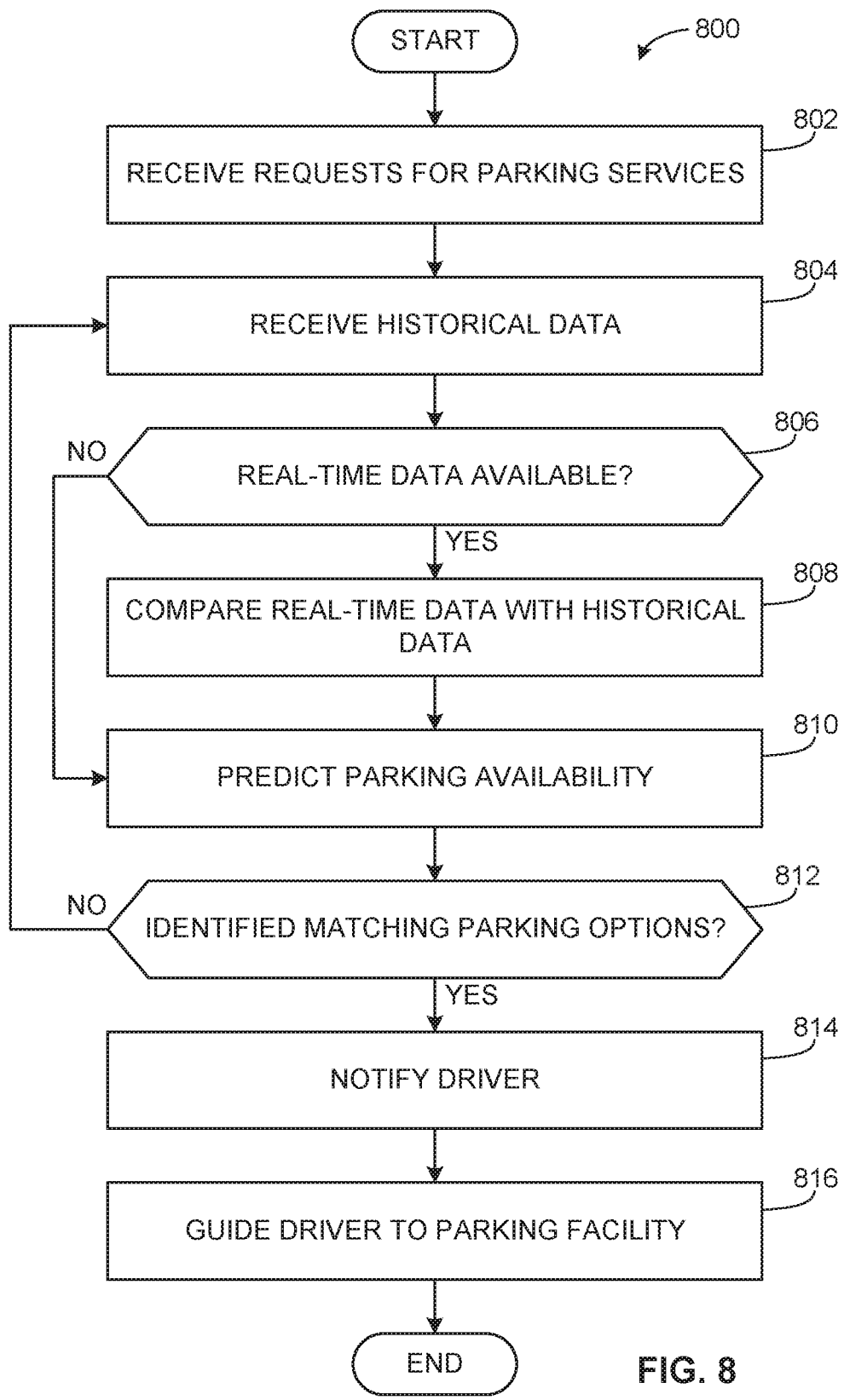
FIG. 8 is a flow diagram of another example method that may be executed to implement the example system shown in FIG. 1A.

FIG. 8 illustrates a flowchart representative of another example method 800 that can be implemented to automatically provide parking and/or vehicle related services to drivers and/or individuals requesting and/or having needs for the services. The example method 800 can be implemented using the smart parking manager 118 and, in some examples, the vehicles 102, the first user devices 112 and/or the parking facilities 122 shown in FIGS. 1A and 1B. The example method 800 begins at block 802 by receiving, via the smart parking manager 118, data associated with requests for parking services (e.g., reserving parking spots at the parking facilities 122). In some examples, the drivers or owners of the vehicles 102 provide requests (e.g., using the first user devices 112) for parking spots near their destination to the smart parking manager 118 prior to their arrival at the parking facilities 122. For example, a driver or owner of a vehicle 102 provides a request to the smart parking manager 118 to reserve a parking spot at a parking facility 112 near their destination during a time interval.

At block 804 the smart parking manager 118 receives historical use data associated with one or more of the parking facilities 122 such as, for example, time intervals that certain vehicles 102 (or other vehicles) may have parked at the parking facilities 122 during historical time intervals. In some examples, the historical use data is provided by the one or more parking facilities 122 (e.g., via the third user devices 142) such as, for example, data associated with receipts and/or transactions for parking services. In other examples, the historical use data is provided by sensors within the one or more parking facilities 122 that are operable to collect and/or receive data corresponding to locations of the vehicles 102, time intervals during which the vehicles 102 parked and/or attributes of the vehicles 102. In other examples, the historical use data is provided by the vehicles 102 (e.g., via the first processor 104) and/or the first user devices 112. In such examples, the vehicles 102 and/or the first user devices 112 can detect and/or determine time intervals that the vehicles 102 may have been parked (e.g., via accelerometers and/or other integral sensors). More generally, the historical use data received at block 804 may indicate availability of services at one or more of the parking facilities 122 during one or more historical time intervals.

At block 806, the smart parking manager 118 determines whether real-time use and/or traffic data associated with the requested parking services are available and/or accessible (e.g., via the one or more wireless and/or web-based communication networks 174) such as, for example, current availability of parking spots at a parking facility 122 and/or current traffic and/or weather conditions near a parking facility 122. If the smart parking manager 118 determines real-time use and/or traffic data is available and/or accessible, control proceeds to block 808, otherwise control proceeds to block 810. In some examples, the real-time use data is provided by one or more of the parking facilities 122 (e.g., via the third user devices 142). In other examples, the smart parking manager receives the real-time traffic and/or weather data via sources of real-time traffic and/or weather data that may be available and/or accessible via the one or more wireless and/or web-based communication networks 174 (e.g., public or private weather services).

At block 808 the smart parking manager 118 processes and/or compares the available and/or accessible real-time use data with the historical use data received at block 804. In some examples, the real-time use data does not correspond to the historical use data with respect to availability of requested services at the parking facilities 122. For example, the historical use data may indicate a requested parking service is not available (e.g., periodically or regularly) during a historical time interval while the real-time use data indicates the parking service is available. In some examples, the smart parking manager 118 may determine differences between the real-time use data and the historical use data during certain time intervals. In other examples, the smart parking manager determines a travel time to reach a parking facility 122 based on real-time traffic and/or weather conditions near the parking facility 122 and/or locations of the vehicles 102 (e.g., via the first processor 104) and/or the first user devices 112 that may have provided requests.

At block 810, the smart parking manager 118 determines and/or predicts parking availability of parking related services at one or more parking facilities 122 based on the historical and/or the real-time use and/or traffic data. In some examples, the smart parking manager 118 determines and/or provides a probability or likelihood with respect to the availability of the parking services, such as reserving parking spots, to facilitate decisions and/or selections of drivers or owners of the vehicles 102 that may be requesting the parking services during requested time intervals. For example, the smart parking manager 118 may determine and/or identify parking spots and/or parking services at a parking facility 122 having regular or periodic availability during certain historical time intervals. Continuing with this example, the smart parking manager 118 may determine and/or provide a probability or likelihood (e.g., a percentage) based on the regular or periodic availability with respect to a time interval requested by a driver or owner of a vehicle 102 to park their vehicle 102. In some examples, the prediction may be initially based on the historical use data received at block 804 in the absence of real-time use and/or traffic data received at block 808. In other examples, if real-time use and/or traffic data is available, the smart parking manager 118 updates the prediction based on the available real-time use and/or traffic data. For example, if the real-time use data indicates certain parking services are available at a parking facility 122 while the historical use data indicates the parking services are not available and/or have a small probability or likelihood, the smart parking manager 122 updates the prediction such as by increasing the determined or provided probability. In other examples, the smart parking manager 118 may compare real-time traffic and/or weather data to the prediction for requests to determine whether delays related to traffic or weather will affect the vehicles 102 such as increase travel time to certain parking facilities 122 based on locations of the vehicles 102 (e.g., via the first processor 104).

At block 812, the smart parking manager 118 identifies and/or determines whether one or more parking services predicted at block 810 matches one or more requested parking related service received at block 802. If the smart parking manager 118 determines at least one parking service predicted at block 810 matches at least one parking request received at block 802, control proceeds to block 814, otherwise control returns to block 804. For example, a probability or likelihood of a predicted parking service at block 810 may include a percentage greater than zero. Continuing with this example, the predicted parking service may be the same type of parking service (e.g., a reservation for a parking spot) as a requested parking service at block 802 and/or may be during a requested time interval.

At block 814 the smart parking manager 118 notifies the drivers or owners of the vehicle 102 associated with the request for parking related services with respect to the determined and/or identified matching predicted parking service. In some examples, a driver or owner of a vehicle 102 may view (e.g., using a first user device 112) the prediction corresponding to their requests to provide a decision or selection with respect to reserving a parking spot and/or to facilitate decisions with respect to using one or more of the parking facilities 122.

At block 816 the smart parking manager 118 directs or guides the drivers or owners of the vehicles 102 to a parking facility 122 corresponding to their selected predicted parking service via, in some examples, the vehicles 102 (e.g., via the first processor 104) and/or the first user devices 112. For example, the smart parking manager 118 uses locations of the vehicles 102 (e.g., via the GPS locator 106), the first user devices 112 and/or the parking facilities 112 to provide routes and/or directions to the drivers of the vehicle 102 and/or the users of the first user devices 112.

Figure 9:
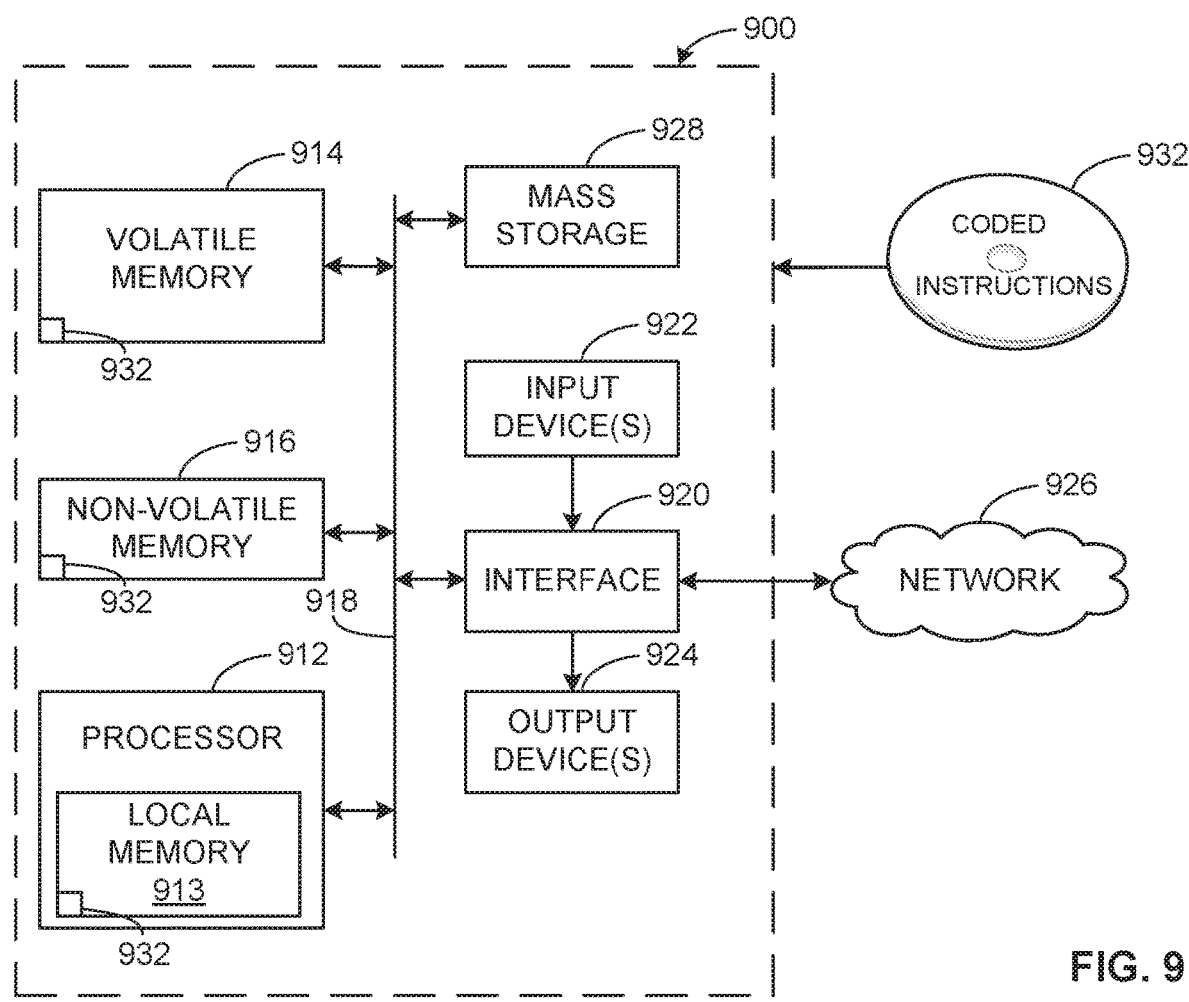
FIG. 9 is a block diagram of an example processor platform that may execute instructions to carry out the example methods of FIGS. 5-8 and/or, more generally, to implement the example system shown in FIG. 1A.

FIG. 9 is a block diagram of an example processor platform 900 capable of executing the instructions to implement the methods of FIGS. 5-8 and the example system 100 of FIGS. 1A and 1B. The processor platform 900 can be, for example, a server, a personal computer, a mobile device (e.g., a cell phone, a smart phone, a tablet such as an iPad™), a personal digital assistant (PDA), an Internet appliance or any other type of computing device.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device(s) 922 permit(s) a user to enter data and commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 920 of the illustrated example, thus, typically includes a graphics driver card, a graphics driver chip or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID systems, and digital versatile disk (DVD) drives.

The coded instructions 932 to implement the methods of FIGS. 5-8 may be stored in the mass storage device 928, in the volatile memory 914, in the non-volatile memory 916, and/or on a removable tangible computer readable storage medium such as a CD or DVD.

From the foregoing, it will appreciated that the above disclosed system, methods and apparatus automatically and/or dynamically provide parking and/or vehicle related services to persons that desire, require and/or have needs for the services. Examples disclosed herein provide vehicles that may have otherwise been parked to persons having a need for transportation and/or the vehicles. Examples disclosed herein provide drivers or vehicle owners with transportation options during times when their vehicles may be parked. Examples disclosed herein employ one or more matching algorithms to automatically and/or dynamically provide parking and/or vehicle related services. Examples disclosed herein receive and/or collect data associated with travel routes and/or patterns of vehicles and/or persons that may have a need for the vehicles and satisfy the need based on the data. Examples disclosed herein receive and/or collect data associated with traffic or use of parking facilities and may predict availability of parking services provided by the parking facilities to satisfy needs of drivers or vehicle owners with respect to parking related services.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:
1. An apparatus, comprising:
a server configured to generate a shared electronic reservation associated with a personal vehicle to be parked in a parking spot of a parking facility, the server configured to be in wireless communication with a first mobile device and a plurality of second mobile devices, the first mobile device associated with an owner of the personal vehicle, respective ones of the second mobile devices associated with corresponding ones of candidate users of the personal vehicle, the server including one or more processors configured to:
receive, from the first mobile device, a first request to park the personal vehicle in the parking spot during a first time interval;
communicate first reservation data based on the first request to an electronic parking meter located at the parking spot, the shared electronic reservation including the first reservation data, the electronic parking meter to reserve the parking spot for the personal vehicle during the first time interval based on the first reservation data of the shared electronic reservation;
receive, from a first one of the second mobile devices having an associated first candidate user, a second request to use the personal vehicle during a second time interval;
determine whether the second time interval falls entirely within the first time interval;
in response to determining that the second time interval falls entirely within the first time interval, transmit a notification from the server to the first mobile device, the notification to request that the owner accept the second request; and in response to receiving an indication from the first mobile device that the owner accepts the second request, communicate second reservation data based on the second request to the electronic parking meter, the shared electronic reservation including the second reservation data, the electronic parking meter to reserve the personal vehicle for use by the first candidate user during the second time interval based on the second reservation data of the shared electronic reservation, the electronic parking meter to implement the shared electronic reservation at the parking spot according to the first and second reservation data.

2. The apparatus of claim 1, wherein the one or more processors are further configured to automatically unlock the personal vehicle during the second time interval.

3. The apparatus of claim 1, wherein the one or more processors are further configured to track locations of the personal vehicle via a mobile device during the second time interval.

4. The apparatus of claim 1, wherein the one or more processors are further to instruct, via a mobile device, the first candidate user to return the personal vehicle to the parking spot based on the second time interval.

5. The apparatus of claim 1, wherein the second request is based on the first candidate user selecting the personal vehicle from among other personal vehicles parked within the parking facility during the first time interval.

6. The apparatus of claim 1, wherein the notification includes an indication of (a) the second time interval associated with the second request, (b) an identity of the first candidate user associated with the second request, and (c) an intended use of the personal vehicle during the second time interval by the first candidate user.

7. The apparatus of claim 1, wherein the first request further includes an indication that the owner has a need for transportation services associated with a vehicle other than the personal vehicle during the first time interval, and wherein the one or more processors are further configured to:

determine a candidate transportation service that is available during the first time interval to satisfy the need for transportation services; and transmit a second notification from the server to the first mobile device, the second notification including an indication of (a) an identity of the candidate transportation service, (b) a route associated with the candidate transportation service, and (c) a cost associated with using the candidate transportation service.

8. A method for generating, via a server having one or more processors, a shared electronic reservation associated with a personal vehicle to be parked in a parking spot of a parking facility, the method comprising:

receiving, at the server from a first mobile device, a first request to park the personal vehicle in the parking spot during a first time interval, the server in wireless communication with the first mobile device, the first mobile device associated with an owner of the personal vehicle;

communicating, via the one or more processors, first reservation data based on the first request to an electronic parking meter located at the parking spot, the shared electronic reservation including the first reservation data, the electronic parking meter to reserve the parking spot for the personal vehicle during the first time interval based on the first reservation data of the shared electronic reservation;

receiving, at the server from a first one of a plurality of second mobile devices associated with corresponding ones of candidate users of the personal vehicle, a second request to use the personal vehicle during a second time interval, the server in wireless communication with the first one of the second mobile devices, the first one of the second mobile devices having an associated first candidate user;

determining, via the one or more processors, whether the second time interval falls entirely within the first time interval;

in response to determining that the second time interval falls entirely within the first time interval, transmitting a notification from the server to the first mobile device, the notification requesting that the owner accept the second request; and in response to receiving an indication from the first mobile device that the owner accepts the second request, communicating, via the one or more processors, second reservation data based on the second request to the electronic parking meter, the shared electronic reservation including the second reservation data, the electronic parking meter to reserve the personal vehicle for use by the first candidate user during the second time interval based on the second reservation data of the shared electronic reservation, the electronic parking meter to implement the shared electronic reservation at the parking spot according to the first and second reservation data.

9. The method of claim 8, wherein the second request is based on the first candidate user selecting the personal vehicle from among other personal vehicles parked within the parking facility during the first time interval.

10. The method of claim 8, wherein the notification includes an indication of (a) the second time interval associated with the second request, (b) an identity of the first candidate user associated with the second request, and (c) an intended use of the personal vehicle during the second time interval by the first candidate user.

11. The method of claim 8, wherein the first request further includes an indication that the owner has a need for transportation services associated with a vehicle other than the personal vehicle during the first time interval, and wherein the method further comprises:

determining, via the one or more processors, a candidate transportation service that is available during the first time interval to satisfy the need for transportation services; and transmitting a second notification from the server to the first mobile device, the second notification including an indication of (a) an identity of the candidate transportation service, (b) a route associated with the candidate transportation service, and (c) a cost associated with using the candidate transportation service.

12. The method of claim 8, further comprising automatically unlocking the personal vehicle during the second time interval.

13. The method of claim 8, further comprising tracking locations of the personal vehicle during the second time interval.

14. The method of claim 8, further comprising instructing the first candidate user to return the personal vehicle to the parking spot based on the second time interval.

15. A tangible machine-readable storage medium comprising instructions which, when executed, cause one or more processors of a server configured to generate a shared electronic reservation associated with a personal vehicle to be parked in a parking spot of a parking facility to at least:
- receive, at the server from a first mobile device, a first request to park the personal vehicle in the parking spot during a first time interval, the server in wireless communication with the first mobile device, the first mobile device associated with an owner of the personal vehicle;
- communicate first reservation data based on the first request to an electronic parking meter located at the parking spot, the shared electronic reservation including the first reservation data, the electronic parking meter to reserve the parking spot for the personal vehicle during the first time interval based on the first reservation data of the shared electronic reservation;
- receive, at the server from a first one of a plurality of second mobile devices associated with corresponding ones of candidate users of the personal vehicle, a second request to use the personal vehicle during a second time interval, the server in wireless communication with the first one of the second mobile devices, the first one of the second mobile devices having an associated first candidate user;
- determine whether the second time interval falls entirely within the first time interval;
- in response to determining that the second time interval falls entirely within the first time interval, cause a notification to be transmitted from the server to the first mobile device, the notification to request that the owner accept the second request; and
- in response to receiving an indication from the first mobile device that the owner accepts the second request, communicate second reservation data based on the second request to the electronic parking meter, the shared electronic reservation including the second reservation data, the electronic parking meter to reserve the personal vehicle for use by the first candidate user during the second time interval based on the second reservation data of the shared electronic reservation, the electronic parking meter to implement the shared electronic reservation at the parking spot according to the first and second reservation data.

16. The tangible machine-readable storage medium of claim 15, wherein the second request is based on the first candidate user selecting the personal vehicle from among other personal vehicles parked within the parking facility during the first time interval.

17. The tangible machine-readable storage medium of claim 15, wherein the notification includes an indication of (a) the second time interval associated with the second request, (b) an identity of the first candidate user associated with the second request, and (c) an intended use of the personal vehicle during the second time interval by the first candidate user.

18. The tangible machine-readable storage medium of claim 15, wherein the first request further includes an indication that the owner has a need for transportation services associated with a vehicle other than the personal vehicle during the first time interval, and wherein the instructions, when executed, cause the one or more processors to:
- determine a candidate transportation service that is available during the first time interval to satisfy the need for transportation services; and
- cause a second notification to be transmitted from the server to the first mobile device, the second notification including an indication of (a) an identity of the candidate transportation service, (b) a route associated with the candidate transportation service, and (c) a cost associated with using the candidate transportation service.

19. The tangible machine-readable storage medium of claim 15, wherein the instructions, when executed, cause the one or more processors to automatically unlock the personal vehicle during the second time interval.

20. The tangible machine-readable storage medium of claim 15, wherein the instructions, when executed, cause the one or more processors to track locations of the personal vehicle during the second time interval.

* * * * *